(12) United States Patent
Martyn

(10) Patent No.: US 9,784,347 B2
(45) Date of Patent: Oct. 10, 2017

(54) APPARATUS FOR CONVERTING MOTION

(71) Applicant: Ten Fold Engineering Limited, Buckinghamshire (GB)

(72) Inventor: David Martyn, Batheaston (GB)

(73) Assignee: Ten Fold Engineering Limited (GB)

( * ) Notice: Subject to any disclaimer, the term of this patent is extended or adjusted under 35 U.S.C. 154(b) by 0 days.

(21) Appl. No.: 14/406,014

(22) PCT Filed: Jun. 4, 2013

(86) PCT No.: PCT/GB2013/000250
§ 371 (c)(1),
(2) Date: Dec. 5, 2014

(87) PCT Pub. No.: WO2013/182834
PCT Pub. Date: Dec. 12, 2013

(65) Prior Publication Data
US 2015/0122081 A1    May 7, 2015

(30) Foreign Application Priority Data

Jun. 6, 2012 (GB) .................................. 1209982.6

(51) Int. Cl.
*F16H 21/02* (2006.01)
*F24J 2/52* (2006.01)
(Continued)

(52) U.S. Cl.
CPC ............. *F16H 21/02* (2013.01); *F16H 21/04* (2013.01); *F24J 2/52* (2013.01); *F24J 2/5431* (2013.01);
(Continued)

(58) Field of Classification Search
CPC .......... F16H 21/02; F16H 21/04; F16H 21/44; F16H 21/10; F24J 2/52; F24J 2/5431;
(Continued)

(56) References Cited

U.S. PATENT DOCUMENTS 822,842 A * 6/1906 Holm ...................... B66F 11/04
182/62.5
2,052,764 A * 9/1936 Harrison ................... G01F 1/50
235/61 C (Continued)

OTHER PUBLICATIONS

International Search Report, PCT Application No. PCT/GB2013/000250, issued Aug. 30, 2013, 4 pages.
(Continued)

*Primary Examiner* — Joshua J Michener
*Assistant Examiner* — Keith Minter
(74) *Attorney, Agent, or Firm* — Christopher McKeon; Arnold & Saunders, LLP

(57) ABSTRACT

An assembly for converting motion, the assembly comprising a first arm rotatable about a first fixed pivot; a second arm rotatable about a second fixed pivot, the second fixed pivot spaced apart from the first fixed pivot; a third arm pivotably connected to the second arm; a first connecting arm extending between the first arm and the third arm, the first connecting arm pivotably connected to the first arm spaced and pivotably connected to the third arm; and a second connecting arm extending between the first arm and the second arm, the second connecting arm pivotably connected to the first arm and pivotably connected to the second arm. The assembly finds use in supporting and moving components of a building. In one embodiment, the assembly finds use in deploying a solar panel array.

21 Claims, 15 Drawing Sheets

(51) Int. Cl.
    F16H 21/04    (2006.01)
    F24J 2/54    (2006.01)
(52) U.S. Cl.
    CPC ............... *Y02B 10/20* (2013.01); *Y02E 10/47* (2013.01); *Y10T 74/18888* (2015.01)
(58) Field of Classification Search
    CPC ......... Y02B 10/20; Y02E 10/47; E01D 15/00; E04H 3/126
    USPC .................. 74/99 R; 52/9, 69, 71, 109, 645
    See application file for complete search history.

(56)  References Cited

U.S. PATENT DOCUMENTS

| | | | | |
|---|---|---|---|---|
| 2,445,004 | A * | 7/1948 | Reynolds | B66F 3/22 182/141 |
| 2,506,151 | A * | 5/1950 | Hoven | A47C 1/032 248/274.1 |
| 2,529,451 | A | 11/1950 | Hoven | |
| 2,550,097 | A * | 4/1951 | Tindal | F42B 19/40 114/20.1 |
| 2,697,845 | A * | 12/1954 | Broner | E01D 15/124 14/45 |
| 3,048,045 | A * | 8/1962 | Ryck | B60S 1/245 15/250.3 |
| 3,253,473 | A * | 5/1966 | Chisholm | F16H 21/10 33/27.01 |
| 3,375,624 | A * | 4/1968 | Mikulin | E04B 1/19 52/109 |
| 3,968,991 | A * | 7/1976 | Maclaren | A61G 5/08 248/436 |
| 4,130,178 | A * | 12/1978 | Smith, Jr. | B66F 3/22 182/141 |
| 4,248,103 | A * | 2/1981 | Halsall | B25J 9/106 74/103 |
| 4,400,985 | A * | 8/1983 | Bond | B65G 47/904 414/744.5 |
| 4,747,353 | A * | 5/1988 | Watt | A47B 9/02 108/145 |
| 4,930,493 | A | 6/1990 | Sallis | |
| 5,102,290 | A * | 4/1992 | Cipolla | H01L 21/67706 198/375 |
| 5,121,765 | A * | 6/1992 | MacMorris, Jr. | E04H 15/505 135/143 |
| 5,219,410 | A * | 6/1993 | Garrec | B62D 57/02 180/8.1 |
| 5,237,887 | A * | 8/1993 | Appleberry | B25J 9/106 74/103 |
| 5,485,763 | A * | 1/1996 | Pincus | A47C 3/02 248/370 |
| 6,095,011 | A * | 8/2000 | Brogårdh | B25J 9/1065 248/278.1 |
| 6,141,934 | A * | 11/2000 | Zeigler | E04H 15/50 135/121 |
| 6,425,303 | B1 * | 7/2002 | Brogårdh | B25J 9/1065 248/278.1 |
| 8,813,455 | B2 * | 8/2014 | Merrifield | E04C 3/005 135/144 |
| 2002/0062605 | A1 * | 5/2002 | Matthews | B60P 3/0252 52/143 |
| 2004/0074123 | A1 * | 4/2004 | Pritchard | G09F 15/0068 40/610 |
| 2004/0083660 | A1 * | 5/2004 | Atkins | E06C 5/04 52/64 |
| 2005/0129495 | A1 * | 6/2005 | Brogardh | B25J 17/0266 414/680 |
| 2005/0172750 | A1 * | 8/2005 | Kock | B25J 9/107 74/490.01 |
| 2005/0204681 | A1 * | 9/2005 | Zeigler | E04B 1/3205 52/646 |
| 2008/0265089 | A1 * | 10/2008 | Zeumer | B64C 9/16 244/99.3 |
| 2012/0248257 | A1 * | 10/2012 | Eichhorn | B64C 9/04 244/214 |
| 2012/0279486 | A1 * | 11/2012 | Sakai | F24J 2/16 126/600 |
| 2013/0189063 | A1 * | 7/2013 | Brogardh | B25J 17/02 414/589 |
| 2013/0192659 | A1 * | 8/2013 | Upton | G01S 3/7861 136/246 |
| 2014/0145059 | A1 * | 5/2014 | Anderson | H02S 20/00 248/550 |
| 2015/0083112 | A1 * | 3/2015 | Ayvazian | F24J 2/52 126/600 |
| 2015/0122081 | A1 * | 5/2015 | Martyn | F16H 21/04 74/99 R |
| 2015/0197976 | A1 * | 7/2015 | Talbot | F16H 21/44 74/89 |
| 2016/0102740 | A1 * | 4/2016 | Martyn | F16H 21/04 52/69 |
| 2016/0186842 | A1 * | 6/2016 | Martyn | F16H 21/04 74/99 R |
| 2016/0195174 | A1 * | 7/2016 | Martyn | F16H 21/04 52/9 |
| 2016/0195175 | A1 * | 7/2016 | Martyn | F16H 21/04 74/99 R |

OTHER PUBLICATIONS

Dijksman, E.A., "The Straight-line Linkages Having a Rectilinear Translating Bar," Precision Engineering, Faculty of Mechanical Engineering, Eindhoven University of Technology, The Netherlands, Advances in Robot Kinematics and Computationed Geometry, 1994, Kluwer Academic Publishers, pp. 411-420.
Straight line mechanism of James Watt: Watt's linkage https://en.wikipedia.org/wiki/Watt%27s_linkage 4 pages.
Linkage of Tchebicheff: Chebyshev linkage https://en.wikipedia.org/wiki/Chebyshev_linkage 3 pages.
Peaucellier-Lipkin inversor: Peaucellier-Lipkin linkage https://en.wikipedia.org/wiki/Peaucellier%E2%80%93Lipkin_linkage 4 pages.
Mechanism of Hart: Hart's inversor https://en.wikipedia.org/wiki/Hart%27s_inversor 1 page.
Scott Russell linear converter: Scott Russell linkage https://en.wikipedia.org/wiki/Scott_Russell_linkage 1 page.

* cited by examiner

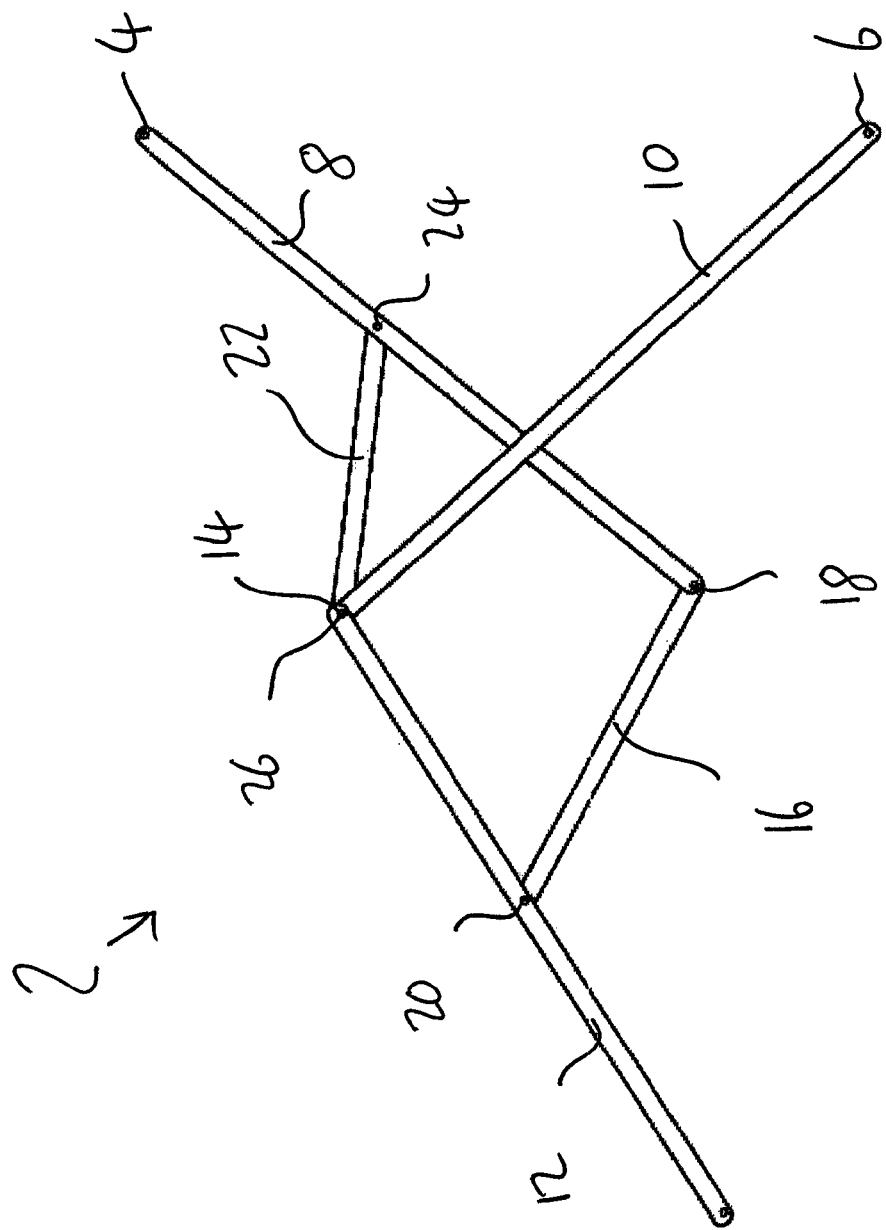

APPARATUS FOR CONVERTING MOTION

The present invention relates to an apparatus for converting motion. In one aspect, the apparatus may be used to producing a straight line motion, in particular an apparatus for producing motion of a component in a straight line generated by the rotational movement of a second component or the motion of the second component about a pivot. In a further aspect, the apparatus may be used to both displace and rotate a first component with respect to a second component.

Mechanisms for converting motion, in particular producing a straight line motion from a rotational motion are known in the art. Such straight line mechanisms may be characterised by comprising a first member rotatable about an axis passing through the member and a second member linked to or associated with the first member, the arrangement being such that rotational movement of the first member about the axis results in a straight line movement of the second member.

Examples of early mechanisms for producing a straight line motion include the straight line mechanism design by James Watt, comprising a series of three levers in end-to-end configuration, with movement of the two end levers about pivots at their free ends causing the middle lever to follow a close approximation to a straight line over a portion of its movement. A related linkage comprising three levers, with the middle lever constrained to follow a straight line was proposed by Tchebicheff. The Peaucellier-Lipkin inversor consists of an arrangement of seven levers and provides a conversion of circular motion into linear motion and vice versa. A related four-lever mechanism was proposed by Hart. A linear converter, known as the half beam mechanism, in which a first linear motion is converted to a second linear motion perpendicular to the first, was designed by Scott Russell.

An analysis of a variety of multi-lever, straight line linkages is provided by Dijksman, E. A. 'Advances in Robot Kinematics and Computationed Geometry', pages 411 to 420, [1994] Kluwer Academic Publishers.

U.S. Pat. No. 4,248,103 discloses a straight line mechanism, in particular a mechanism of the so-called 'conchoid' type. There is disclosed a linkage mechanism for an industrial manipulator comprising at least two of the said straight line mechanisms.

U.S. Pat. No. 4,400,985 concerns a straight line link mechanism, comprising a plurality of pivotally connected links. The links are connected between a support and a controlled member. As one of the links is moved in a 360° arc, the controlled member alternately moves in a first direction along a linear path and thereafter in the opposite direction along a curved path. The weight of the controlled member may be balanced by the use of a counter weight, to provide a lifting mechanism. A cam may be employed to control the motion of the controlled member.

More recently, U.S. Pat. No. 4,747,353 discloses a straight line motion mechanism formed from a pair linkage mechanisms arranged in a parallelogram in combination with a motion control means. The motion control means interconnects the two linkage mechanisms and provide a uniform angular displacement of each linkage mechanism.

U.S. Pat. No. 5,102,290 concerns a transfer device for transferring a workpiece from a first location to a second location. The workpiece is moved in a trochoidal way by means of a pickup arm mounted to roll along a flat surface.

A straight line mechanism is disclosed in U.S. Pat. No. 5,237,887. The mechanism comprises a static base and a platform supported by first and second arm assemblies. Each of the first and second arm assemblies comprises portions pivotally connected to the static base. The arrangement of the pivoted arm portions of each arm assembly is such that the platform is constrained to move in a straight line, as the portions of the arms move about their respective pivot connections.

Still more recently, WO 97/33725 discloses a device for the relative movement of two elements. The device comprises at least two first links connected to a first element by a hinged connection so as to form a four-hinge system and pivot in a plane parallel to the plane of the first element. At least two second links are connected to the second element so as to form a four-hinge system and to pivot in a plane parallel to the plane of the second element. The two four-hinge systems provided by the first and second links are coupled in series to allow relative motion of the first and second elements.

WO 99/14018 discloses a device for the relative movement of two elements. The device comprises at least two link devices coupled between the elements, each comprising two mutually articulated link units. A first link unit is connected to first, moveable element. The second of the link units is connected to the second, static element. Power applied to the link units causes the first element to move relative to the second.

A mechanical linkage is described and shown in U.S. Pat. No. 2,506,151. The linkage comprises a plurality of interconnected levers. The linkage provides for movement of one member with respect to a fixed member. The linkage is specifically described and shown for use in providing movement for components of a chair, in particular to allow for movement of the seat of the chair in a rearwardly-downwardly and forwardly-upwardly direction. The linkage is indicated in U.S. Pat. No. 2,506,151 to provide for movement of the moveable member in a straight path with respect to the fixed member.

There is a need for an improved assembly for providing a straight line motion, in particular for providing an element moveable in a straight line in response to a rotational motion. It would be most advantageous if the assembly could be arranged in a compact form, thereby occupying only a small volume of space.

An assembly for converting a rotary motion into a straight line motion has now been found which relies upon an assembly of five levers or arms having pivoted connections therebetween.

According to the present invention, there is provided an assembly for converting motion, the assembly comprising:

a first arm rotatable at a first position thereon about a first fixed pivot;

a second arm rotatable at a first position thereon about a second fixed pivot, the second fixed pivot spaced apart from the first fixed pivot;

a third arm pivotably connected at a first position thereon to the second arm at a second position on the second arm, the second position spaced apart from the first position on the second arm;

a first connecting arm extending between the first arm and the third arm, the first connecting arm pivotably connected to a second position on the first arm spaced apart from the first position and pivotably connected to the third arm at a second position thereon spaced apart from the first position thereon; and a second connecting arm extending between the first arm and the second arm, the second connecting arm pivotably connected to a third position on the first arm disposed between the first and second positions thereon and pivotably connected to a third position on the second arm.

In operation of the assembly, rotation of the first arm about the first fixed pivot results in rotation of the second arm about the second fixed pivot and movement of the third arm. In particular, the third arm is caused to move such that a point on the third arm (herein referred to as 'the said point') spaced from the first position on the third arm and located such that the second position on the third arm lies between the said point and the first position moves in a straight line. Thus, rotational motion of the first arm and the second arm about their respective fixed pivots results in a straight line motion of the said point on the third arm. In this respect, it is to be noted that the said point on the third arm referred to traces a line that is substantially straight, that is represents a very close approximation to a straight line. In particular, the path followed by the said point may be characterised as being a very flat sine wave, that is a sine wave of high wavelength and very low amplitude.

The assembly of the present invention provides a number of significant advantages, in particular compared with the linkages and mechanisms of the prior art, such as those discussed above. First, in preferred embodiments of the assembly, the said point on the third arm moves in a substantially straight line extending perpendicular to the line joining the first and second fixed pivots. This is a particularly advantageous arrangement, for example when employing the assembly in a building to provide movement of one portion of the building with respect to another, such as moving a portion of the building laterally from a fixed building structure.

Second, the assembly of the present invention may be arranged such that the arms of the assembly are accommodated one within the other in a very compact configuration, for example all lying between the first and second fixed pivots. This compactness is a significant advantage of the assembly of this invention.

Further, the said point on the third arm may be arranged to always be the forwardmost point of the assembly in the direction of motion of the said point. This arrangement provides significant advantages over known assemblies, where the point moving in a straight line is contained within or otherwise surrounded by other components of the assembly.

The point on the third arm referred to above is spaced from the first position on the third arm, with the second position on the third arm lying between the said point and the first position. The location of the said point will depend upon the length of the arms of the device and the positions of their interconnections. In one preferred embodiment, the said point is arranged to be at a distal location on the third arm, that is distal from the first and second positions on the third arm, preferably with the said point being located at the free end of the third arm or in an end portion at the free end of the arm.

The extent of the straight line motion of the said point on the third arm varies according the precise positioning of the connections between the arms. For example, in one embodiment, it has been found that this close approximation to a straight line motion by the said point on the third arm occurs over a distance that is up to 85% of the distance between the first and second fixed pivots. Further embodiments provide motion of the said point on the third arm that follows a close approximation to a straight line for a distance up to or exceeding 100% of the distance between the first and second fixed pivots. References herein to a motion of the said point on the third arm in a 'straight line' are references to this movement.

As noted, the said point on the third arm moves in a pattern that is a close approximation to a straight line. The deviation of the movement of the said point from a straight line may be exemplified by the following:

In an embodiment of the assembly in which the distance between the first fixed pivot and the second fixed pivot is 3250 mm, the said point on the third arm describes an approximate straight line of 2750 mm in length. In particular, the said point moves between a first or retracted position and a second or extended position. In this respect, references to motion of the said point are with respect to the line joining the first and second fixed pivots, with the retracted position being at or close to the line joining the first and second fixed pivots and the retracted position being distant therefrom. As noted, the said point on the third arm moves between the retracted position and the extended position, with the line joining the retracted and extended positions being a straight line perpendicular to the line extending between the first and second pivots. However, in moving between the retracted and extended positions, the said point follows a sine wave having a maximum deviation from the straight line of 8 mm. This deviation represents a deviation of just 0.25% of the distance travelled by the said point between the retracted and extended positions and is generally insignificant in the context of most if not all practical applications of the assembly.

In another embodiment of the assembly in which the distance between the first fixed pivot and the second fixed pivot is 3250 mm, the said point on the third arm describes an approximate straight line of 3254 mm in length. In this embodiment, the deviation of the said point moves in a sine wave having a maximum deviation from a straight line of just 31.4 mm, that is just 0.96% of the distance travelled by the said point.

The arrangement of the assembly of the present invention may be varied depending upon the requirements. For example, the assembly may be arranged to provide a longer straight line movement of the said point on the third arm with a slightly greater deviation from a straight line. Alternatively, the assembly may be arranged to provide a shorter straight line movement of the said point, with the path traced by the said point being a closer approximation to a straight line with less deviation.

When moving between the retracted and the extended positions, the said point on the third arm follows a substantially straight line. Other points on the third arm follow a respective arc.

It has been found that the aforementioned assembly provides a number of significant advantages. First, the point of the assembly that traces a straight line moves away from the mechanism, that is leads the mechanism in the direction of motion of the said point. As noted, the assembly may be considered to be movable from a retracted position to an extended position, with a point on the third arm moving in a straight line between the retracted and extended positions. The point on the third arm moves in a straight line away from the retracted position to the extended position. In particular, the assembly is such that, in operation, a point on the third arm traces a straight line that extends away from the first and second fixed pivot points, in particular from the line joining the first and second pivot points. More particularly, in many embodiments, the straight line path followed by the said point on the third arm extends perpendicular to the line joining the first and second pivot points. This is an advantage over assemblies of the prior art and allows the assembly of the present invention to be more versatile and have a wider range of applications. In particular, it allows the assembly to be placed or mounted on a plane and to have all motion of the components confined to one side of the plane. Thus, for example, the assembly may be used on an exterior surface of a construction, such as a building or the like, and all components move from the retracted to the extended positions on the exterior, without encroaching on or requiring space on the interior side of the plane.

Further, the arms of the assembly may be constructed such that the arms may be accommodated one within another. The components of the assembly may be arranged such that, when in the retracted position, the third arm and first and second connecting arms are accommodated within or adjacent the first and second arms, thereby providing for a particularly compact assembly when in the retracted position.

The assembly has been defined hereinbefore by reference to a plurality of arms. It is to be understood that the term 'arm' is used as a general reference to any component that may be connected as hereinbefore described and/or moved about a fixed pivot. Accordingly, the term 'arm' is to be understood as being a reference to any such component, regardless of shape or configuration.

As noted above, the assembly of the present invention provides a motion of the said point on the third arm that follows a straight line over a specific extent of its movement. The close approximation of the movement of the said point on the third arm to a straight line between the retracted and extended positions makes the assembly of the present invention particularly useful as a straight line converter, that is able to convert a rotational movement of the first and/or second arms about the first and second fixed pivots respectively, into a straight line motion of the said point on the third arm. However, the operation of the assembly is not limited to this extent of movement of the third arm. Rather, continued movement of the assembly beyond the extended position to a super-extended position causes the third arm to move to a position that is perpendicular to and displaced from the line joining the first and second fixed pivots. This movement of the third arm away from the line joining the first and second fixed pivots with simultaneous rotation of the third arm, once beyond the extended position, is also particularly useful, for example in deploying items connected to the third arm away from the line joining the first and second fixed pivots. Indeed, it has been found that the third arm may be moved to a position in which it extends at any desired angle to the line joining the first and second pivots, in particular up to and including perpendicular to the line. This is a further advantageous aspect of the assembly of the present invention, in particular compared with assemblies of the prior art, which have only limited movement of the components.

As noted, operation of the assembly results in motion of the third arm. It is to be understood that the assembly may be used to convert a rotational motion of the first or second arms about the first or second fixed pivots into a motion of the said point on the third arm, that is by having drive to the assembly provided at the first or second arms. Alternatively, the assembly may be used to convert a motion of the third arm into a rotational motion of the first and second arms, that is by having drive to the assembly applied at the third arm.

The assembly of the present invention comprises a first arm. The first arm may have any shape and configuration. A preferred form for the first arm is an elongate member, for example a bar or a rod. The first arm is pivotably mounted at a first position on the arm to a first fixed pivot. The pivotable connection at the first position may be of any suitable form, preferably a pin, spindle or axle passing through the arm about which the arm is free to move. The first position may be in any suitable location on the arm. In one preferred embodiment, the first position is at or adjacent one end of the arm.

The first arm may function as a driving arm for the assembly, that is have a force applied thereto so as to rotate the arm about the fixed pivot at the first position on the arm, thereby transferring drive to the other components of the assembly. Alternatively, the first arm may be a driven arm of the assembly, that is move about the fixed pivot under the action of the other components of the assembly. The assembly of the present invention is particularly advantageous when the first arm operates as a driving arm.

The first position on the first arm may be at any suitable location thereon. In one preferred embodiment, the first position is at or adjacent the first end of the first arm.

The assembly further comprises a second arm. The second arm may have any shape and configuration. A preferred form for the second arm is an elongate member, for example a bar or a rod. The second arm is pivotably mounted at a first position on the second arm to a second fixed pivot. The pivotable connection at the first position may be of any suitable form, preferably a pin, spindle or axle passing through the arm about which the arm is free to move. The first position may be in any suitable location on the second arm. In one preferred embodiment, the first position is at or adjacent one end of the second arm.

The second arm is moved about the second fixed pivot under the action of either movement of the first arm or the third arm.

The second arm may function as a driving arm for the assembly, that is have a force applied thereto so as to rotate the arm about the fixed pivot at the first position on the arm, thereby transferring drive to the other components of the assembly. Alternatively, the second arm may be a driven arm of the assembly, that is move about the fixed pivot under the action of the other components of the assembly. The assembly of the present invention is particularly advantageous when the second arm operates as a driving arm.

The assembly further comprises a third arm. The third arm may have any shape and configuration. A preferred form for the third arm is an elongate member, for example a bar or a rod. The third arm is pivotably mounted at a first position on the third arm to the second arm. The pivotable connection between the second and third arms may be of any suitable form, preferably a pin, spindle or axle passing through the arms about which one or both of the arms are free to move.

The third arm is pivotably connected to the second arm at a first position on the third arm and a second position on the second arm. The first position may be in any suitable location on the third arm. In one preferred embodiment, the first position is at or adjacent one end of the third arm.

The second position on the second arm is spaced apart from the first position on the second arm. In one preferred embodiment, the second position on the second arm is at or adjacent the second end of the second arm.

In operation of the assembly, as noted above, the third arm has a point thereon that follows the path of a straight line when the assembly is moved between the retracted and extended positions. This point on the third arm is spaced apart from the first position on the third arm, that is the position on the third arm at which the second and third arms are pivotably connected together. The third arm may be a driven arm, that is moved under the action of movement of the first and second arms. In this case, rotation of the first arm about the first fixed pivot causes the third arm to move, such that the said point on the third arm follows the straight line path between the retracted and extended positions. Alternatively, the third arm may be a driving arm, that is have a force applied thereto resulting in movement of the third arm, which in turn drives the other components of the assembly to result in movement of the first arm about the first fixed pivot. For example, application of a straight line force to the said point on the third arm between the retracted and extended positions results in rotational movement of the first arm about the first fixed pivot.

The distance between the first and second fixed pivots and the lengths of the first, second and third arms may be selected according to the desired movement of the components to be achieved and the particular application of the assembly. Specific embodiments of the assembly are described in detail below with reference to FIG. 1.

However, generally, the ratio of the length of the first arm, that is the distance between the first and second positions on the first arm, to the distance between the first and second fixed pivots may range from 0.5 to 2.0, more preferably from 0.6 to 1.75, still more preferably from 0.75 to 1.5. The first arm is preferably no longer than, more preferably shorter in length than the distance between the first and second fixed pivots. The ratio of the length of the first arm to the distance between the first and second fixed pivots is therefore more preferably from 0.75 to 0.99, still more preferably from 0.8 to 0.99, in particular from 0.9 to 0.99. A ratio of about 0.92 to about 0.98 is particularly suitable for many applications.

The ratio of the length of the second arm, that is the distance between the first and second positions on the second arm, to the distance between the first and second fixed pivots may range from 0.5 to 2.0, more preferably from 0.6 to 1.75, still more preferably from 0.75 to 1.5. The second arm is preferably shorter in length than the distance between the first and second fixed pivots. The ratio of the length of the second arm to the distance between the first and second fixed pivots is therefore more preferably from 0.75 to 0.99, still more preferably from 0.8 to 0.99, in particular from 0.9 to 0.99. A ratio of about 0.92 to about 0.98 is particularly suitable for many applications.

The length of the second arm is preferably selected to be as long as possible, within the constraints of the other components of the assembly and the desired motion. In this way, the arc through which the second position on the second arm moves about the second fixed pivot has as large a radius as possible. This facilitates the positioning of the second connecting arm.

The second arm may be longer or shorter than the first arm. In one preferred embodiment, the first and second arms are of the same length.

Taking the length of the third arm to be the distance between the first position on the third arm and the said point on the third arm, the length of the third arm will be determined by the arrangement of the first and second arms, together with the connecting arms. In some embodiments, the length of the third arm is less than that of the first and second arms, in particular from 0.9 to 0.99 of the length of the first and/or second arms. For example, with the first and second arms being of equal length and less than the distance between the first and second fixed pivots, the third arm has a length of about 0.975. In alternative embodiments, the length of the third arm is the same as that of the first arm and/or the second arm. In one particularly preferred arrangement, the first, second and third arms are the same length.

The assembly further comprises a first connecting arm. The first connecting arm extends between the first arm and the third arm. The first connecting arm may have any shape and configuration. A preferred form for the first connecting arm is an elongate member, for example a bar or a rod. The first connecting arm is pivotably mounted to each of the first and third arms. The pivotable connections between the first connecting arm and each of the first and third arms may be of any suitable form, preferably a pin, spindle or axle passing through the arms about which one or both of the arms are free to move.

The pivotable connections may be at any suitable location on the first connecting arm. In one preferred embodiment, the pivotable connection between the first connecting arm and the first arm is at or adjacent one end of the first connecting arm and/or the pivotable connection between the first connecting arm and the third arm is at or adjacent the second end of the first connecting arm.

The first connecting arm is connected to the first arm at a second position on the first arm. The second position on the first arm is spaced apart from the first position on the first arm. In one preferred embodiment, the second position on the first arm is at or adjacent the second end of the first arm.

The first connecting arm is further connected to the third arm at a second position on the third arm, which second position is spaced apart from the first position on the third arm.

The first connecting arm may have any suitable length. Its length is preferably the distance between the positions on the first and third arms between which the first connecting arm extends.

The second position on the third arm, at which the first connecting arm is connected, may be selected according to a number of factors. First, the first connecting arm acts to provide support for the third arm, in particular to assist in supporting any load applied to the third arm. The requirement for the third arm to be supported in this manner by the first connecting arm is a factor in determining the location of the second position on the third arm. Second, the overall strength and stability of the assembly is related to the length of the first connecting arm, with the strength and stability reducing as the length of the first connecting arm increases.

The second position on the third arm may be at any suitable position. In particular, the ratio of the distance between the first position and the second position on the third arm and the distance between the first position and the said point on the third arm may be from 0.1 to 0.9, more preferably from 0.2 to 0.8, still more preferably from 0.3 to 0.7, in particular from 0.35 to 0.6. A preferred ratio is from 0.4 to 0.55. The ratio of the distance between the first position and the second position on the third arm and the distance between the first position and the said point on the third arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the second position on the third arm and the distance between the first position and the said point on the third arm about 0.41 to about 0.47.

The assembly further comprises a second connecting arm. The second connecting arm extends between the first arm and the second arm. The second connecting arm may have any shape and configuration. A preferred form for the second connecting arm is an elongate member, for example a bar or a rod. The second connecting arm is pivotably mounted to each of the first and second arms. The pivotable connections between the second connecting arm and each of the first and second arms may be of any suitable form, preferably a pin, spindle or axle passing through the arms about which one or both of the arms are free to move.

The pivotable connections may be at any suitable location on the second connecting arm. In one preferred embodiment, the pivotable connection between the second connecting arm and the first arm is at or adjacent one end of the first connecting arm and/or the pivotable connection between the second connecting arm and the second arm is at or adjacent the second end of the second connecting arm.

The second connecting arm is connected to the first arm at a third position on the first arm, which third position is spaced apart from and between both the first and second positions on the first arm.

The third position on the first arm, at which the second connecting arm is connected, may be selected according to a number of factors. First, the second connecting arm acts to provide support for the first arm, in particular to assist in supporting any load applied to the first arm. The requirement for the first arm to be supported in this manner by the first connecting arm is a factor in determining the location of the third position on the first arm. Second, as with the first connecting arm, the overall strength and stability of the assembly is related to the length of the second connecting arm, with the strength and stability reducing as the length of the second connecting arm increases.

The third position on the first arm may be at any suitable position. In particular, the ratio of the distance between the first position and the third position on the first arm and the distance between the first position and the second position on the first arm may be from 0.1 to 0.9, more preferably from 0.2 to 0.8, still more preferably from 0.3 to 0.7, in particular from 0.4 to 0.6. A preferred ratio is from 0.4 to 0.55. The ratio of the distance between the first position and the third position on the first arm and the distance between the first position and the second position on the first arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the third position on the first arm and the distance between the first position and the second position on the first arm about 0.4 to 0.5.

The second connecting arm is further connected to the second arm at a third position on the second arm. In one embodiment of the assembly, the third position is spaced apart from and between the first and second positions on the second arm. In an alternative embodiment, the third position on the second arm coincides with the second position on the second arm, such that the second connecting arm is connected to both the second and third arms. This arrangement has the advantage of being particularly compact.

The third position on the second arm is at or spaced from the second position on the second arm and may be at any suitable position. In particular, the ratio of the distance between the first position and the third position on the second arm and the distance between the first position and the second position on the second arm may be from 0.8 to 1.0, more preferably from 0.85 to 1.0, still more preferably from 0.875 to 1.0, in particular from 0.9 to 1.0. A preferred ratio is from 0.925 to 1.0. One particularly preferred embodiment of the assembly has the ratio of the distance between the first position and the third position on the second arm and the distance between the first position and the second position on the second arm about 0.95 to 1.0.

The second connecting arm may have any suitable length. Its length is preferably the distance between the positions on the first and second arms between which the second connecting arm extends.

Relative movement of the components of the assembly may be limited or restricted, for example to limit the movement of the third arm such that the motion of the said point is confined to a straight line between the retracted and extended positions. Suitable means for limiting the relative movement of components of the assembly include a flexible tie or tether extending between two of the arms and connecting arms. In one embodiment, a flexible tie or tether extends between the first arm and the third arm, in particular between a point on the first arm between the first and third positions thereon and the first position on the third arm. One preferred form for the flexible tie comprises a plurality of hingedly connected arms or arm assemblies moveable between a folded condition when the assembly is in the retracted position and a fully extended condition in the extended position.

In a particularly preferred embodiment of the assembly of the present invention, the lengths of the first, second and third arms, and first and second connecting arms are selected in accordance with the above criteria and to fold up when in the retracted position to lie between the first and second fixed pivots. It is a particular advantage that the assembly can be arranged to be in such a compact form when in the retracted position. In a preferred embodiment, the first, second and third arms and first and second connecting arms are formed with portions having 'I' and 'L' shapes in cross-section, with the portions being arranged to allow the arms to be accommodated within one another when in the retracted position.

It is a further advantage of the assembly of present invention that it is highly scaleable and may be constructed and applied at a wide range of scales to convert motion, as described hereinbefore.

The assembly finds wide applications and uses, in particular by allowing relative movement between a first component and a second component.

Accordingly, in a further aspect, the present invention provides an assembly comprising a first component and a second component, the first component being arranged for movement with respect to the second component, wherein an assembly as hereinbefore described is provided between the first component and second component, operation of the assembly providing movement of the first component with respect to the second component.

One of the first and second components is connected to the third arm of the assembly. The other of the first and second components provides the first and second fixed pivot points to which the first and second arms are pivotally connected. In this way, movement of the first component with respect to the second component is effected. As noted above, such relative movement may be effected by applying a force to the first arm, the second arm or to the third arm of the assembly.

The assembly comprising the first and second components finds extensive use in providing relative movement between two components. For example, the assembly finds use in moving a first component connected to either of the first or second arms and rotating about the respective first or second fixed pivot and a second component connected to the said point on the third arm and moveable in a linear motion between the retracted and extended positions. Further, the assembly finds use in displacing and rotating a first component connected to the third arm relative to the first or second fixed pivots or the line extending therebetween.

In many applications, a plurality of assemblies is employed. In particular, a plurality of assemblies may be employed in a spaced apart relationship on opposing sides of an object to be moved. For example, a first and second assembly may be provided on opposing sides of an object to be moved with the third arms of two assemblies connected to opposing sides of the object.

Applications of the assembly of the present invention to convert rotational motion to linear motion include the support and movement of building structures relative to one another.

Accordingly, the present invention further provides a building comprising:

a first building portion and a second building portion, the first building portion being moveable relative to the second building portion between a retracted position and an extended position;

wherein relative movement between the first and the second building portions and support of one of the first and second building portions with respect to the other of the first and second building portions are provided by an assembly as hereinbefore described.

The first building portion may be any structure or part of a building, in particular a fixed structure, such as a house, apartment or office building, or a mobile building structure, such as a mobile house, caravan or the like. The second building structure may be any structure or component of the installation that is required to be moved relative to the first building portion between the retracted and extended positions. Examples of such structures include balconies, floor extensions, roof extensions, canopies and the like.

Further applications and uses for the assembly of the present invention are in moving a first component connected to the third arm to both displace and rotate it from the first and second fixed pivots and the line extending therebetween. As described above, this is achieved by operating the assembly to move the third arm past the extended position into a super extended position. As noted, the third and any component connected thereto can be moved from a retracted position, in which the third arm and the component extend parallel to the line extending between the first and second fixed pivots, and an extended position, in which the component and the third arm extend perpendicular to the line extending between the first and second fixed pivots.

Any components may be moved and supported in this manner using the assembly of the present invention. Examples include temporary installations, such as walls, partitions, and signs, such as road signs. In one embodiment, the component to be moved is a solar panel, the solar panel being moved between a stowed position and a deployed position. In moving from the stowed position to the deployed position, the solar panel is both displaced and rotated relative to the orientation in the stowed position.

Accordingly, in a further aspect, the present invention provides a solar panel assembly, comprising:

a base assembly;

an array of one or more solar panels;

wherein the array is connected to the base by an assembly as hereinbefore described.

The principles and operation of the assembly of the present invention will be further explained by reference to the accompanying figures, in which.

Figure 1:
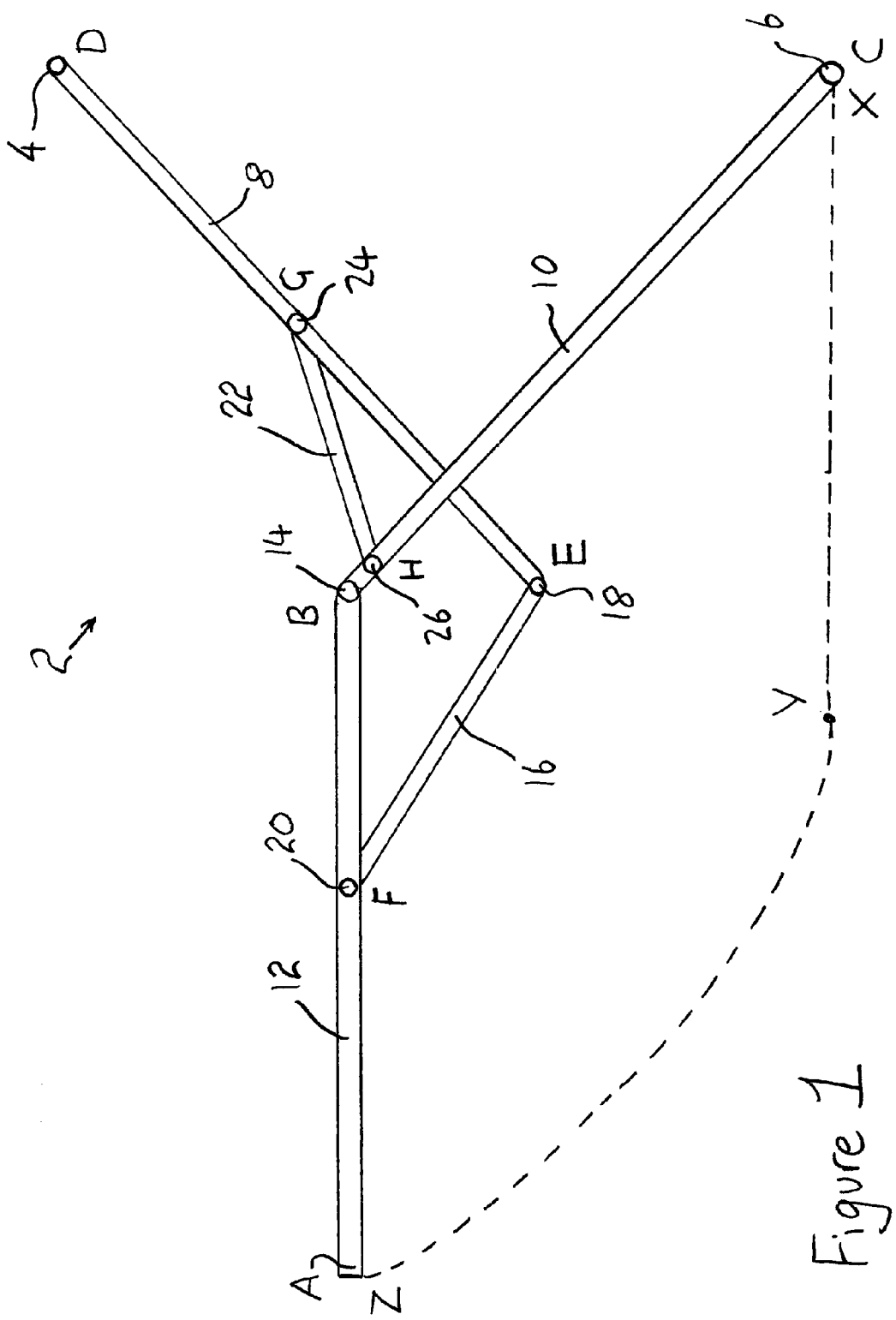
FIG. 1 is a simplified diagrammatical representation of an assembly according to the present invention in a super-extended position.
Figure 4A:
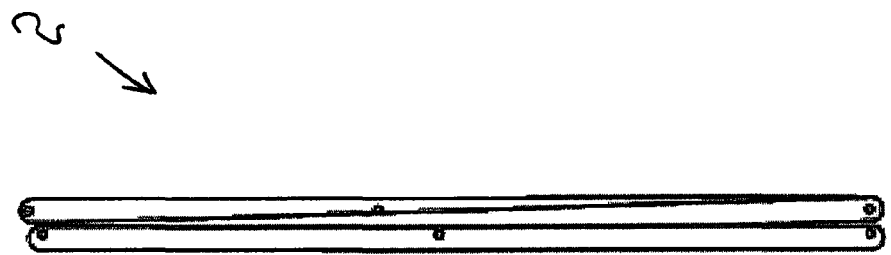
Figure 4B:
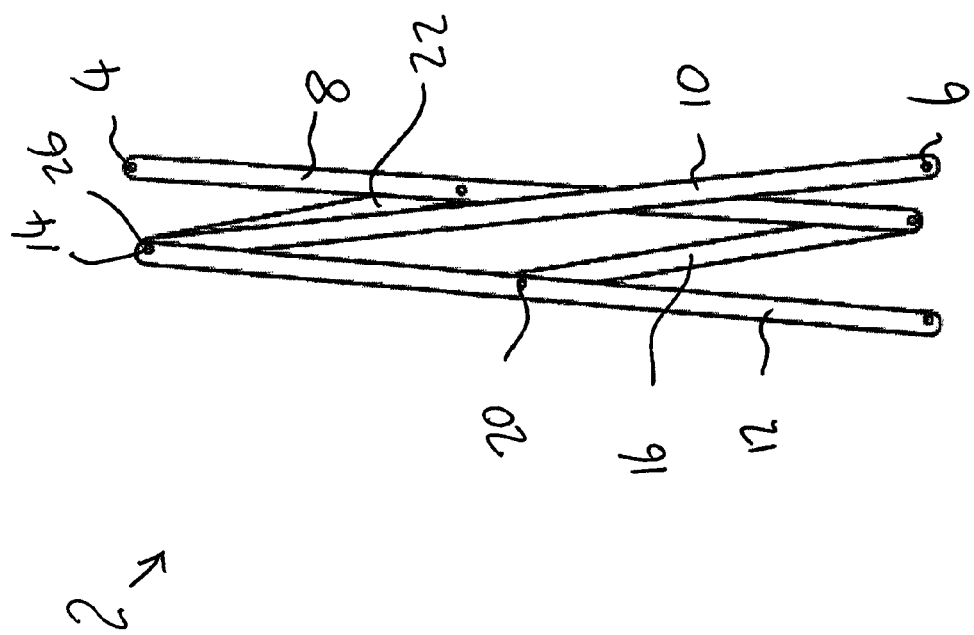
Figure 4C:
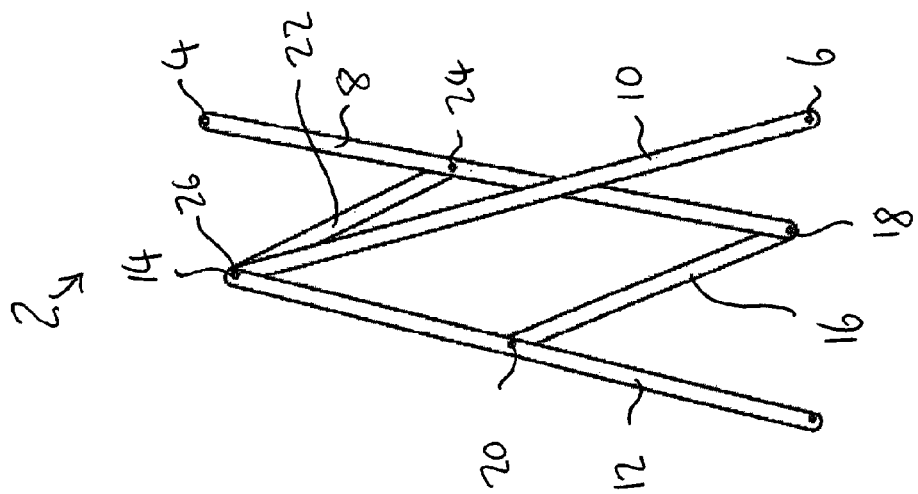
Figure 4D:
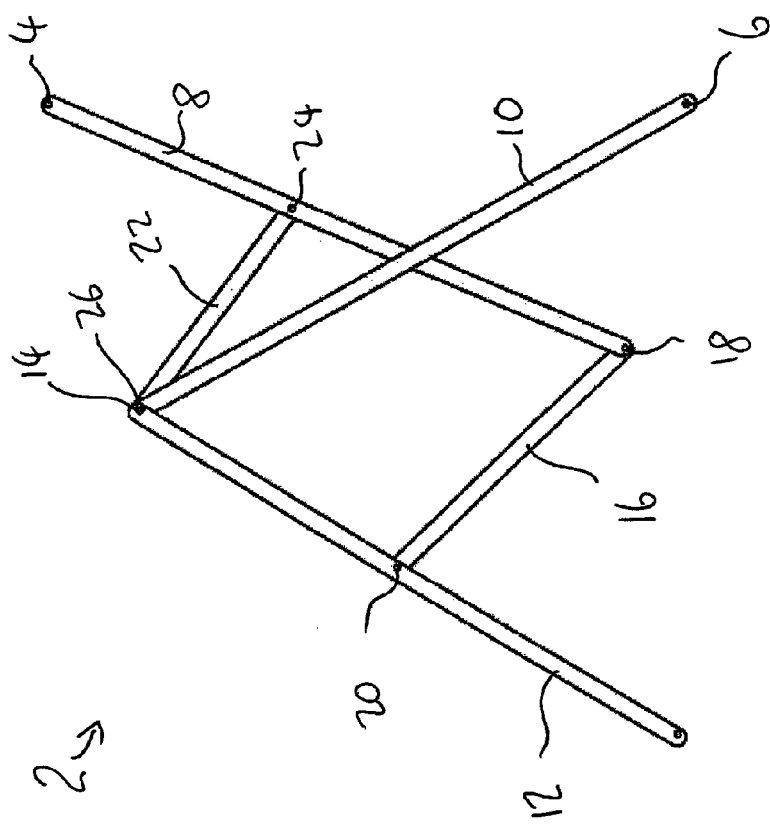
Figure 4F:
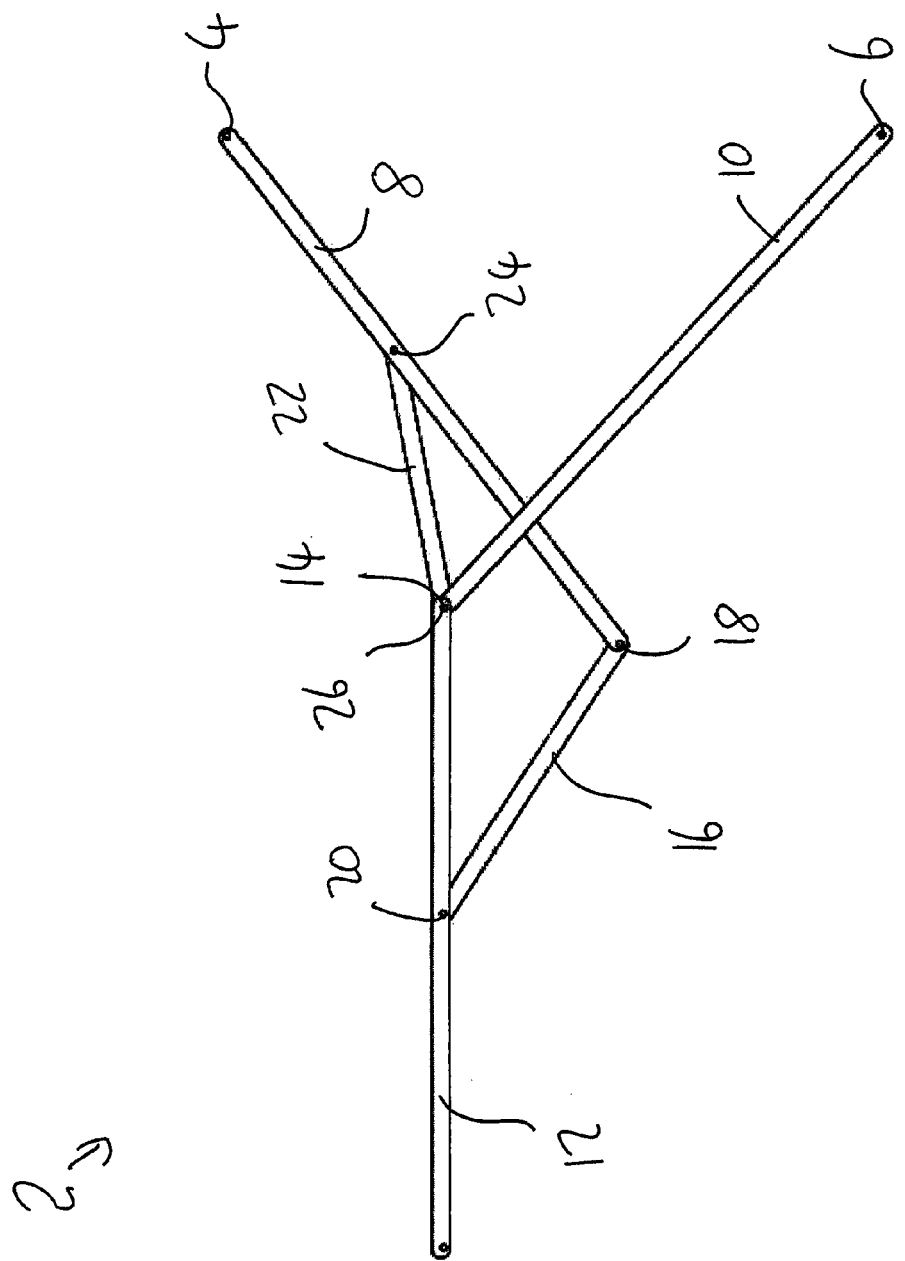

FIGS. 4a to 4f are diagrammatical representations of an assembly according to a further embodiment of the present invention in a series of positions between a retracted position shown in FIG. 4a and an extended position shown in FIG. 4f; and FIGS. 5a to 5e are perspective views of a solar panel assembly comprising assemblies of the general arrangement of FIG. 1 in a range of positions from retracted to deployed.

Turning to FIG. 1, there is shown a diagrammatical representation of an assembly of one embodiment of the present invention, generally indicated as 2. The assembly 2 is shown mounted to a fixed structure at a first fixed pivot 4 and a second fixed pivot 6. The fixed pivots 4, 6 are spaced apart and are fixed in relation to one another.

A first arm 8 is pivotally connected at a first position D at one end to the first fixed pivot 4. A second arm 10 is pivotally connected at a first position C at one end to the second fixed pivot 6. A third arm 12 is mounted at one end by a pivot connection 14 at the second end of the second arm 10, the position of this connection being indicated as B in FIG. 1.

A first connecting arm 16 is mounted at one end by a pivot connection 18 at the second end of the first arm 8, the position of this connection being indicated as E in FIG. 1. The second end of the first connecting arm is mounted by a pivot connection 20 to the third arm at a position F spaced from the position B.

A second connecting arm 22 is mounted at one end by a pivot connection 24 to the first arm at a position d spaced from both positions D and E. The second end of the second connecting arm 22 is mounted by a pivot connection 26 to the second arm at a position H spaced from both positions C and B.

The pivot connections may be formed by any suitable means, for example by pins extending through holes in the arms being pivotally joined.

Movement of the first arm 8 about the first fixed pivot 4 and the second arm 10 about the second fixed pivot 6 causes the third arm 12 to move such that a point A on the third arm moves between a retracted position X and an extended position Y. In moving between the positions X and Y, the point A describes a substantially straight line. Further movement of the first and second arms 8, 10 causes the point A to move beyond the extended position Y and follow an arc to a super-extended position Z.

A first exemplary arrangement of the assembly of FIG. 1 has the dimensions set out in Table 1.

TABLE 1

| Dimension of assembly of FIG. 1 | Length (mm) |
| --- | --- |
| C-D | 3250 |
| D-E | 3000 |
| C-B | 3000 |
| B-A | 2925 |
| D-G | 1485 |
| C-H | 2850 |
| B-F | 1250 |
| E-F | 1500 |
| G-H | 1085 |
| X-Y | 2750 |

The arrangement of Table 1 provides movement of point A to follow an approximate straight line X-Y perpendicular to the line joining the fixed pivots at points C and D, the straight line having a length C to Y of 2750 mm and a maximum deviation from a straight line of 8 mm.

A second exemplary arrangement of the assembly of FIG. 1 has the dimensions set out in Table 2.

TABLE 2

| Dimension of assembly of FIG. 1 | Length (mm) |
| --- | --- |
| C-D | 3250 |
| D-E | 3200 |
| C-B | 3200 |
| B-A | 3200 |
| D-G | 1343 |
| C-H | 3200 |
| B-F | 1535 |
| E-F | 1615 |
| G-H | 1293 |
| X-Y | 2197 |

In the assembly of Table 2, the second connecting arm 22 is connected to the second arm 10 such that the distance from point H to point B is zero. The arrangement of Table 2 provides movement of point A to follow an approximate straight line X-Y perpendicular to the line joining the fixed pivots at points C and D, the straight line having a length C to Y of 2197 mm and a maximum deviation from a straight line of just 5.7 mm.

A third exemplary arrangement of the assembly of FIG. 1 has the dimensions set out in Table 3.

TABLE 3

| Dimension of assembly of FIG. 1 | Length (mm) |
| --- | --- |
| C-D | 3250 |
| D-E | 3200 |
| C-B | 3200 |
| B-A | 3200 |
| D-G | 1387 |
| C-H | 3200 |
| B-F | 1535 |
| E-F | 1615 |
| G-H | 1337 |
| X-Y | 3254 |

In the assembly of Table 3, the second connecting arm 22 is connected to the second arm 10 such that the distance from point H to point B is zero. The arrangement of Table 2 provides movement of point A to follow an approximate straight line X-Y perpendicular to the line joining the fixed pivots at points C and D, the straight line having a length C to Y of 3254 mm and a maximum deviation from a straight line of 31.4 mm.

A fourth exemplary arrangement of the assembly of FIG. 1 has the dimensions set out in Table 4.

TABLE 4

| Dimension of assembly of FIG. 1 | Length (mm) |
| --- | --- |
| C-D | 3250 |
| D-E | 3200 |
| C-B | 3200 |
| B-A | 3200 |
| D-G | 1467 |
| C-H | 3200 |
| B-F | 1535 |
| E-F | 1615 |
| G-H | 1417 |
| X-Y | 4372 |

In the assembly of Table 3, the second connecting arm 22 is connected to the second arm 10 such that the distance from point H to point B is zero. The arrangement of Table 2 provides movement of point A to follow an approximate straight line X-Y perpendicular to the line joining the fixed pivots at points C and D, the straight line having a length C to Y of 4372 mm and a maximum deviation from a straight line of 133.7 mm.

Figure 2A:
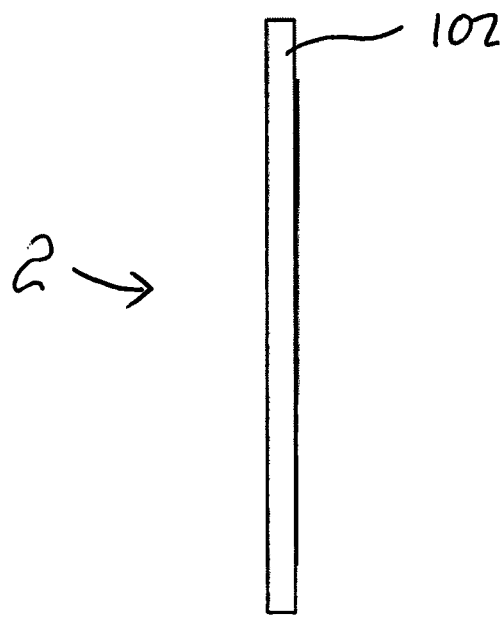
FIG. 2a is a diagrammatical representation of the assembly of one embodiment of the present invention in a retracted position.
Figure 2B:
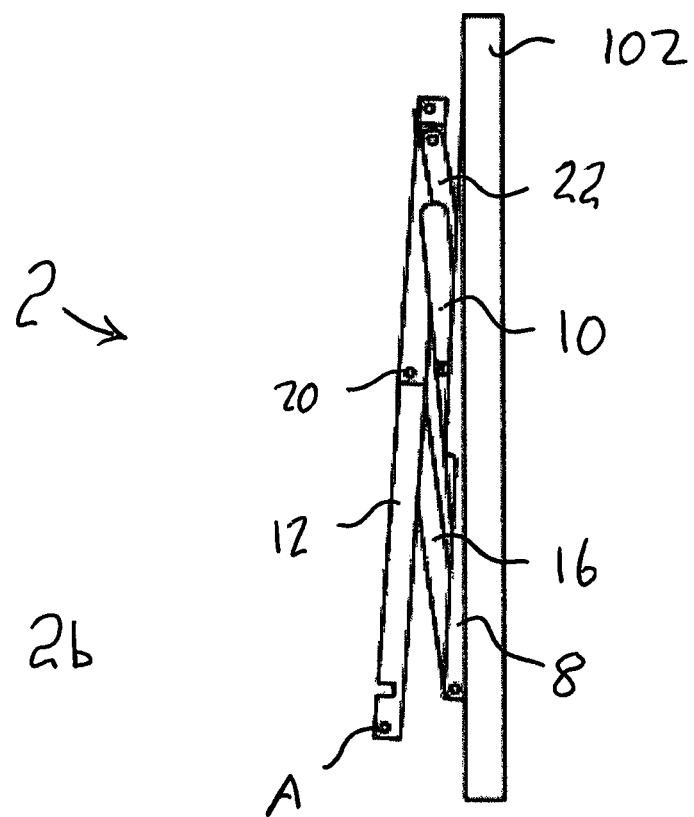
FIG. 2b is a diagrammatical representation of the assembly of FIG. 2a in a first partially extended position.
Figure 2C:
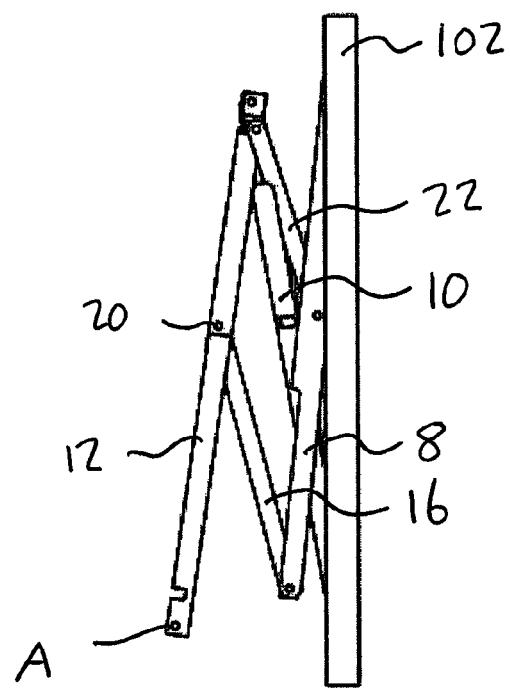
FIG. 2c is a diagrammatical representation of the assembly of FIG. 2a in a second partially extended position.
Figure 2D:
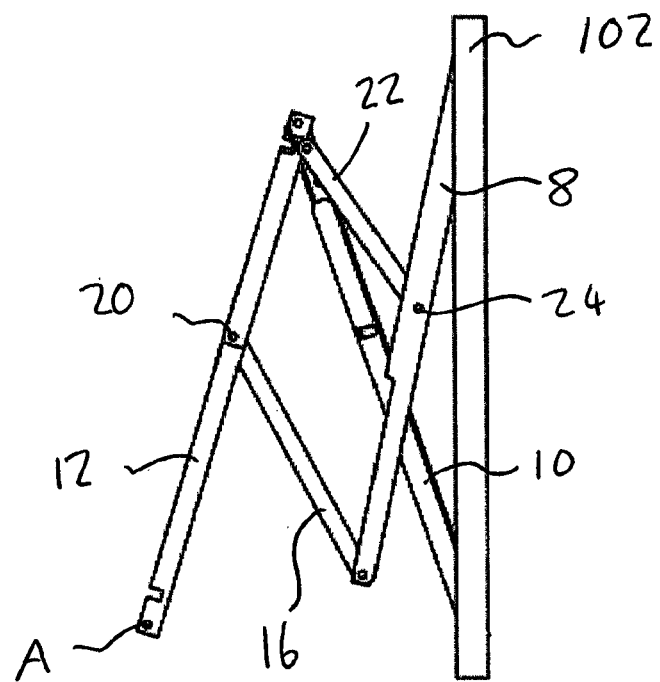
FIG. 2d is a diagrammatical representation of the assembly of FIG. 2a in a third partially extended position.
Figure 2E:
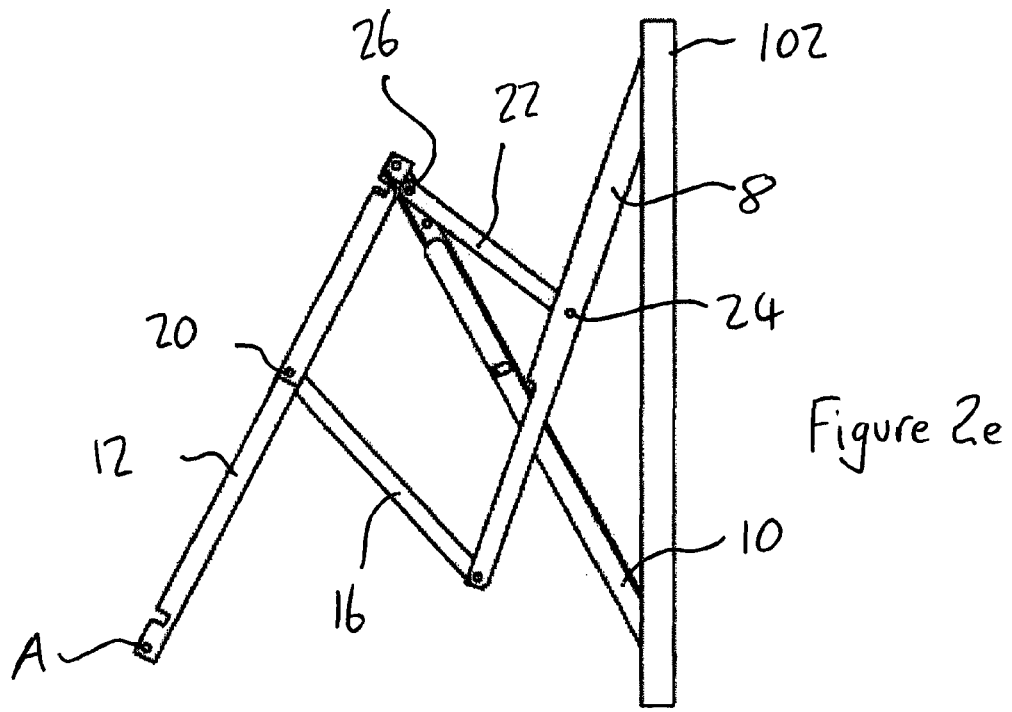
FIG. 2e is a diagrammatical representation of the assembly of FIG. 2a in an extended position.
Figure 2F:
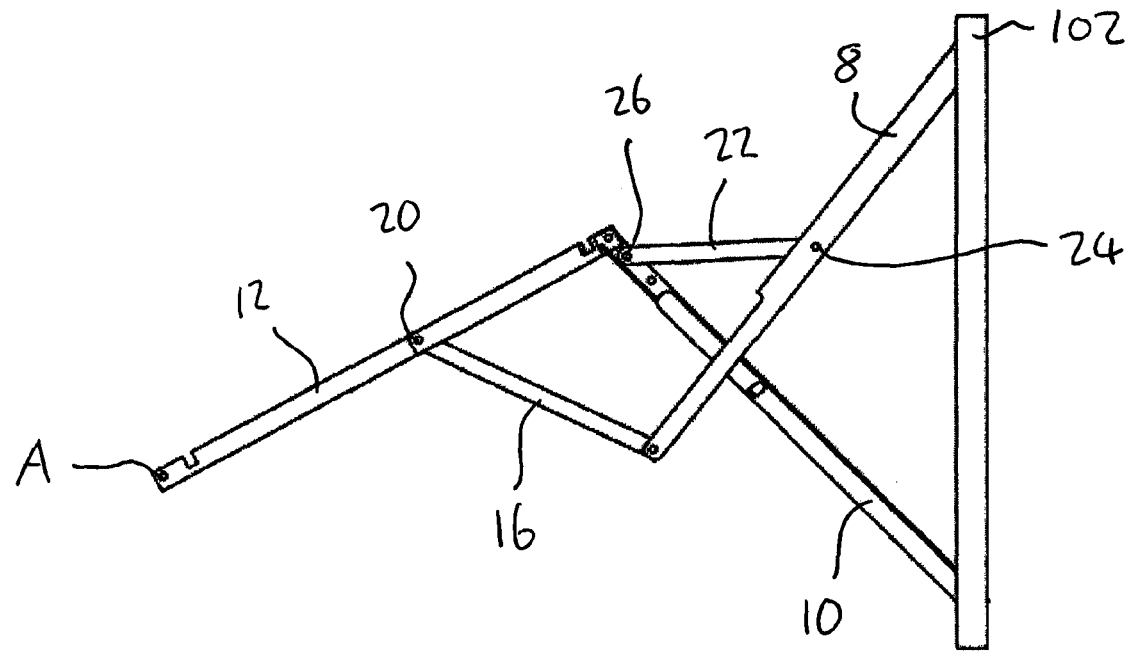
FIG. 2f is a diagrammatical representation of the assembly of FIG. 2a in a partially super extended position.
Figure 2G:
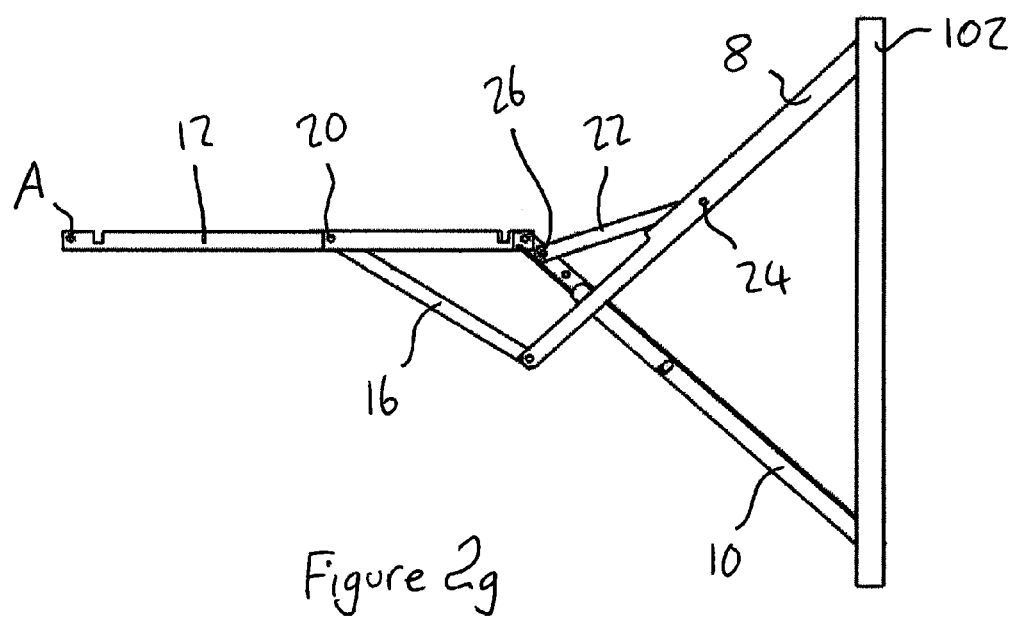
FIG. 2g is a diagrammatical representation of the assembly of FIG. 2a in a super extended position.

Turning now to FIGS. 2a to 2g, there is shown a sequence of drawings of an assembly of one embodiment of the present invention in positions between a retracted position, shown in FIG. 2a, and a super extended position shown in FIG. 2g. The components of the assembly of FIGS. 2a to 2g have been identified using the same reference numerals as used in relation to FIG. 1 and discussed above.

Referring to FIG. 2a, the assembly 2 is shown in a retracted position held within a frame 102, providing the mounting for the fixed pivots 4 and 6. The arms of the assembly are formed to lie within one another when in the retracted position of FIG. 2a, in particular with the arms having appropriate flat, 'L'-shaped and 'U'-shaped forms at portions along their lengths. In this way, the assembly 2 occupies the minimum amount of space when in the retracted position.

The assembly 2 is shown in FIG. 2b in a first partially extended position, with the third arm 12 having moved away from the fixed pivots 4, 6 and the frame 202, that is to the left as viewed in the figure. In the movement from the position of FIG. 2a to the position of FIG. 2b, the point A at the end of the third arm 12 is following a substantially straight line.

FIG. 2c shows the assembly 2 in a second partially extended position, with the third arm 12 moved further away from the fixed pivots 4, 6. Again, point A on the third arm 12 is tracing a substantially straight line from its position in the retracted position of FIG. 2a.

Similarly, FIG. 2d shows the assembly 2 in a third partially extended position, with the third arm 12 still further from the fixed pivots 4, 6 and the point A on the third arm 12 still following a straight line path.

FIG. 2e shows the assembly 2 in its extended position, that is with the third arm 12 at a position where the point A is at the end of the straight line path followed from the retracted position.

Further movement of the third arm 12 causes the point A on the third arm to follow an arcuate path, that is to move leftwards and upwards, into a partially super extended position, as viewed in FIG. 2f. In this way, the third arm 12 is both being moved away from and rotated with respect to the pivots 4, 6.

Finally in this sequence, referring to FIG. 2g, the assembly 2 is shown in the fully super extended position. In this position, the third arm 12 extends perpendicular to the line extending between the first and second fixed pivots 4, 6.

Referring now to FIGS. 3a to 3e, there is shown a pair of conjoined assemblies of the general arrangement of the assembly of FIGS. 1 and 2a to 2g. The assemblies, generally indicated as 202a and 202b, have the general configuration of the assembly shown in FIG. 1 and components of the assemblies are indicated using the reference numerals used in FIG. 1. The assemblies 202a, 202b are arranged in a parallel orientation and mounted to a generally rectangular frame 204. In particular, the frame 204 comprises first and second upright members 206a and 206b connected by upper and lower horizontal members 208a and 208b. The upright members 206a and 206b provide the first and second pivot points 4, 6 for a respective assembly 202a and 202b.

Figure 3A:
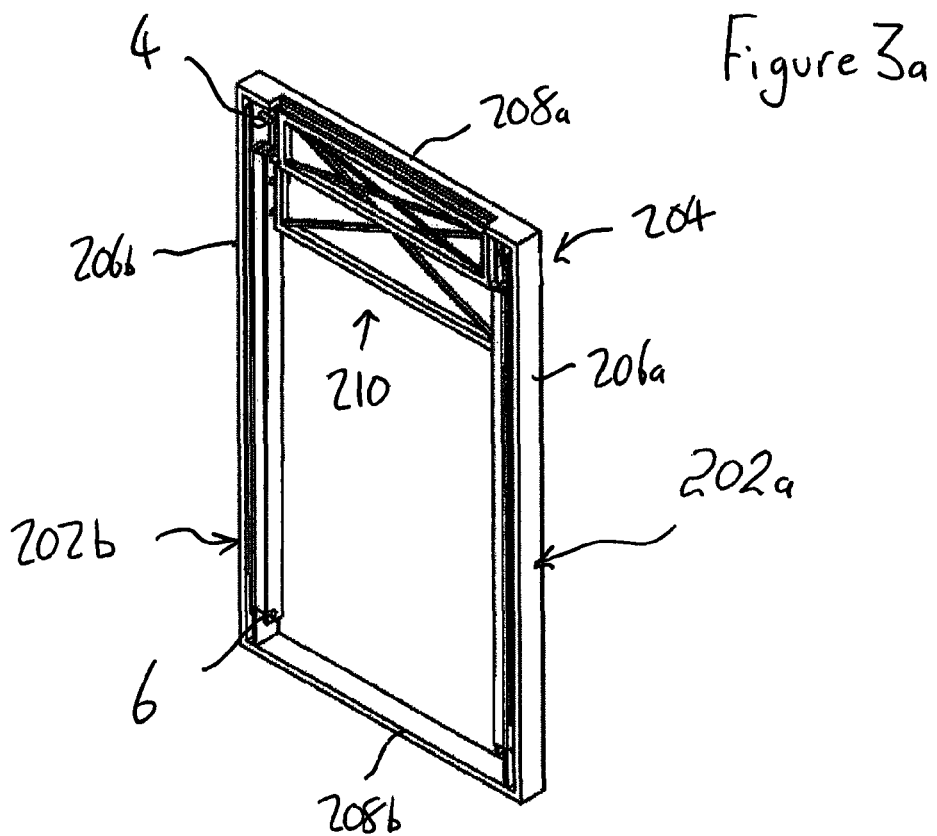
FIGS. 3a to 3e are perspective views of two conjoined assemblies of the general arrangement of FIG. 1 it a series of positions between a retracted position in FIG. 3a and an extended position in FIG. 3e.
Figure 3B:
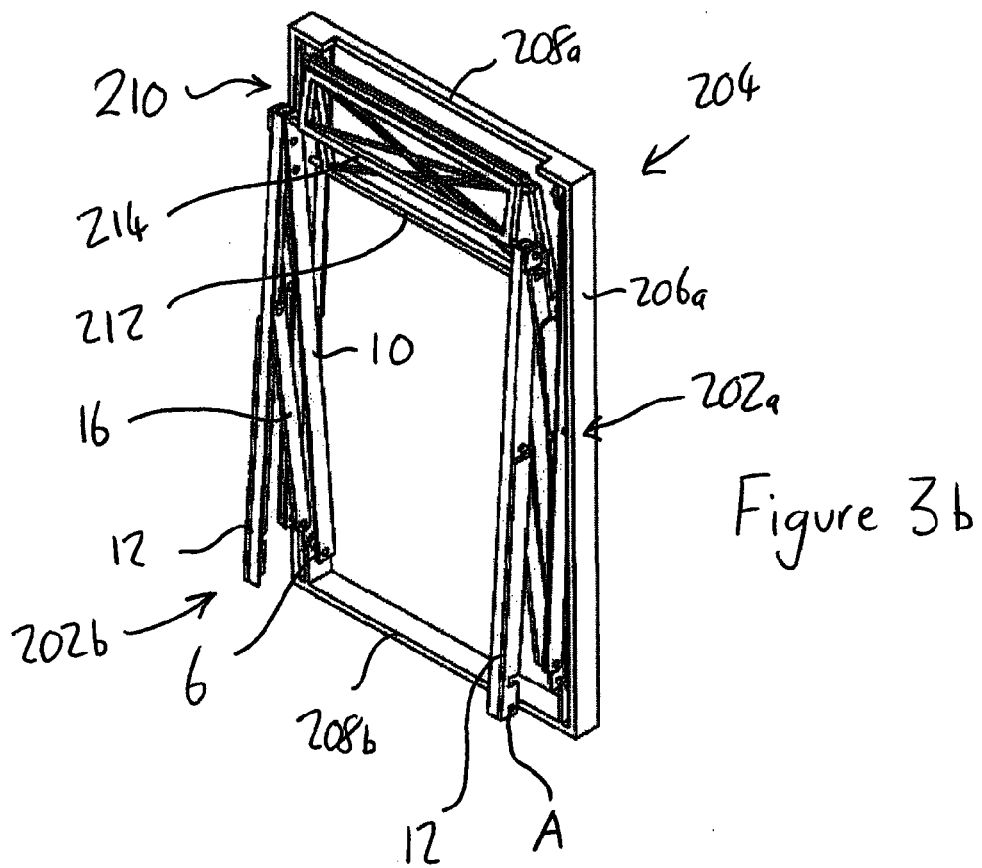
Figure 3C:
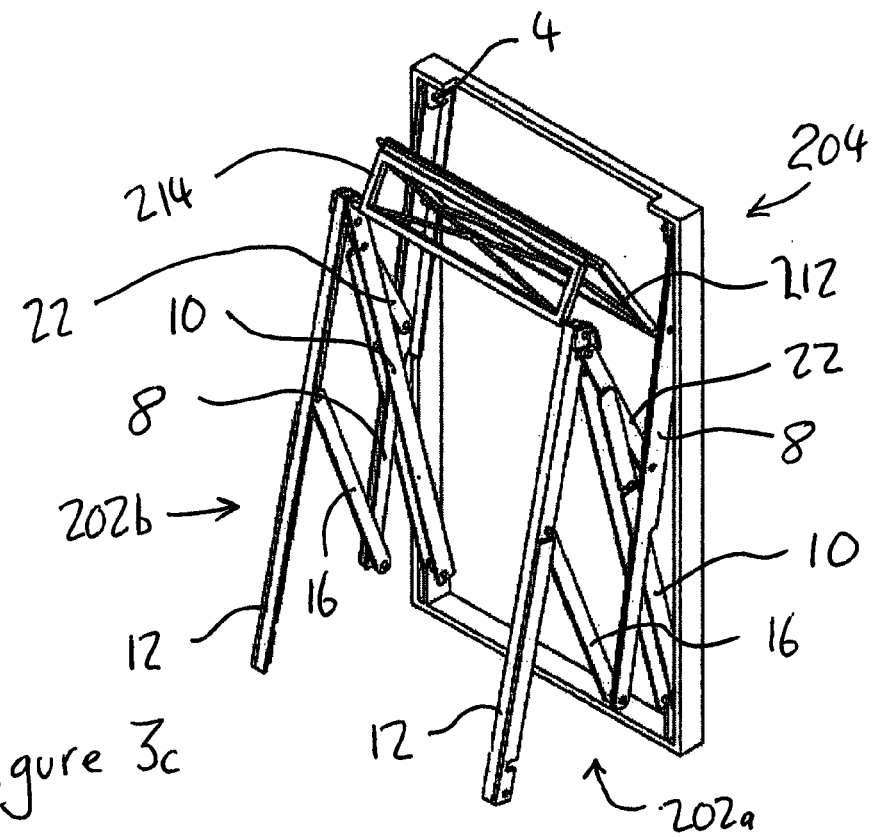
Figure 3D:
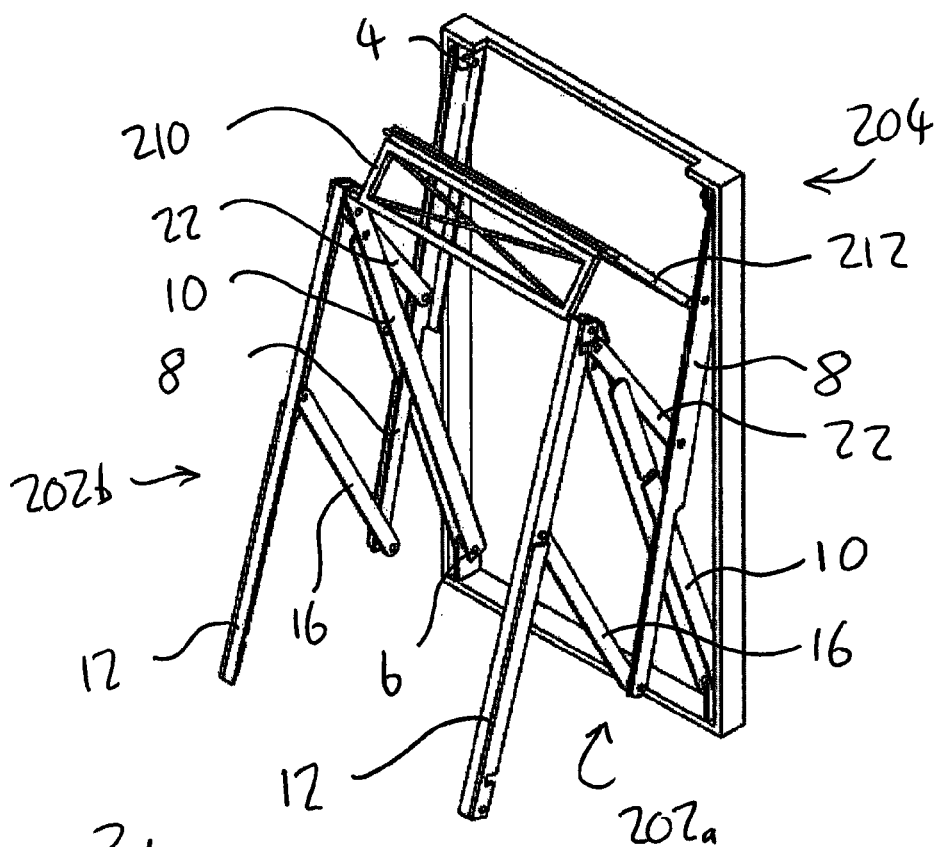

As shown in FIG. 3a, the assemblies 202a and 202b are in the retracted position and lie within the members of the frame 204. The arrangement and form of the members of each assembly 202a, 202b are such that the members may be accommodated within one another, thereby occupying a minimum volume when in the retracted position, as shown in FIG. 3a.

Figure 3E:
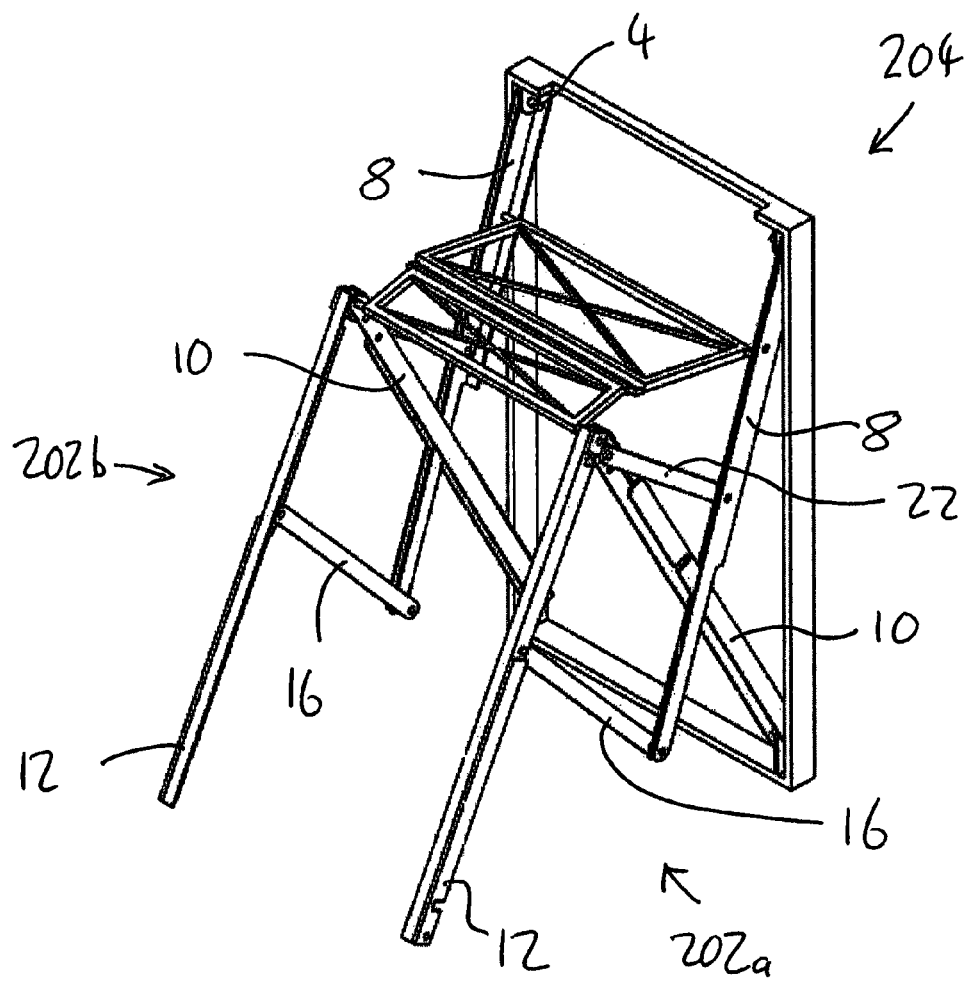

Referring in turn to each of FIGS. 3a to 3e, the assemblies 202a and 202b are shown in positions as the assemblies move from the retracted position of FIG. 3a to the extended position of FIG. 3e.

The assemblies 202a and 202b are interconnected in their upper portions by a frame assembly, generally indicated as 210 and comprising a first, generally rectangular frame portion 212 and a second, generally rectangular frame portion 214. The first frame portion 212 is pivotally mounted to the upper end portion, as viewed in the figures, of the first arm 8 of each of the assemblies 202a, 202b by a simple pin arrangement. The second frame portion 214 is similarly pivotally mounted to the upper end portion of the second arm 10. Further, the first and second frame portions 212, 214 are pivotally connected to each other. In operation, as the first and second assemblies 202a, 202b extend from the retracted position, the frame assembly 210 unfolds. The frame assembly 210 serves a number of functions. First, it operates to coordinate the movement of the assemblies 202a and 202b. In particular, the frame assembly 210 ensures that the assemblies 202a, 202b remain parallel to one another. Further, the frame assembly 210 acts to limit the movement of the assemblies 202a, 202b, in particular preventing the assemblies from moving past the retracted position, as shown in Figure Ae. It is to be understood that appropriate sizing of the frame assembly 210 allows the movement of the assemblies 202a, 202b to be restricted in this manner, as required. It will further be understood that a similar function of controlling and limiting the movement of the assemblies 202a, 202b may be obtained by having the frame 210 extend between other components of the assemblies.

It will be appreciated that the general arrangement shown in FIGS. 3a to 3e is particularly suitable for supporting a component between the assemblies 202a, 202b for movement with respect to the frame 204.

Turning now to FIGS. 4a to 4f, there is shown a sequence of drawings of an assembly of a further embodiment of the present invention in positions between a retracted position, shown in FIG. 4a, and a super extended position shown in FIG. 4f. The components of the assembly of FIGS. 4a to 4f have been identified using the same reference numerals as used in relation to FIG. 1 and discussed above.

The assembly shown in FIGS. 4a to 4f has the same general configuration as that shown in FIGS. 1 and 2 and described above. However, in the embodiment of FIGS. 4a to 4f, the pivotal connection between the second connecting arm 22 and the second arm 10 coincides with the connection between the second arm 10 and the third arm 12, that is, the positions H and B are at the same location.

Referring to FIG. 4a, the assembly 2 is shown in a retracted position between the fixed pivots 4 and 6. The arms of the assembly are formed to lie within one another when in the retracted position of FIG. 4a, in particular with the arms having appropriate flat, 'L'-shaped and 'U'-shaped forms at portions along their lengths. In this way, the assembly 2 occupies the minimum amount of space when in the retracted position.

The assembly 2 is shown in FIG. 4b in a first partially extended position, with the third arm 12 having moved away from the fixed pivots 4, 6, that is to the left as viewed in the figure. In the movement from the position of FIG. 4a to the position of FIG. 4b, the point A at the end of the third arm 12 is following a substantially straight line.

FIG. 4c shows the assembly 2 in a second partially extended position, with the third arm 12 moved further away from the fixed pivots 4, 6. Again, point A on the third arm 12 is tracing a substantially straight line from its position in the retracted position of FIG. 4a.

FIG. 4d shows the assembly 2 in its extended position, that is with the third arm 12 at a position where the point A is at the end of the straight line path followed from the retracted position.

Further movement of the third arm 12 causes the point A on the third arm to follow an arcuate path, that is to move leftwards and upwards, into a partially super extended position, as viewed in FIG. 4e. In this way, the third arm 12 is both being moved away from and rotated with respect to the pivots 4, 6.

Finally in this sequence, referring to FIG. 4f, the assembly 2 is shown in the fully super extended position. In this position, the third arm 12 extends perpendicular to the line extending between the first and second fixed pivots 4, 6.

Examples of the use of the assemblies will now be described.

Referring to FIGS. 5a to 5e, there is shown a solar panel assembly, generally indicated as 302. The assembly 302 comprises a generally rectangular base assembly 304, having a foldable leg 306 extending from each corner thereof to provide stability to the assembly.

Opposing major sides of the base assembly 304 are each provided with an assembly, 308a, 308b, each of the general configuration of FIG. 1 and FIGS. 2a to 2g. The assembly shown in FIGS. 4a to 4f could also be used in the solar panel assembly 302, in like manner. The assemblies 308a, 308b have their first and second fixed pivots provided by the respective side member of the base assembly 304.

Figure 5A:
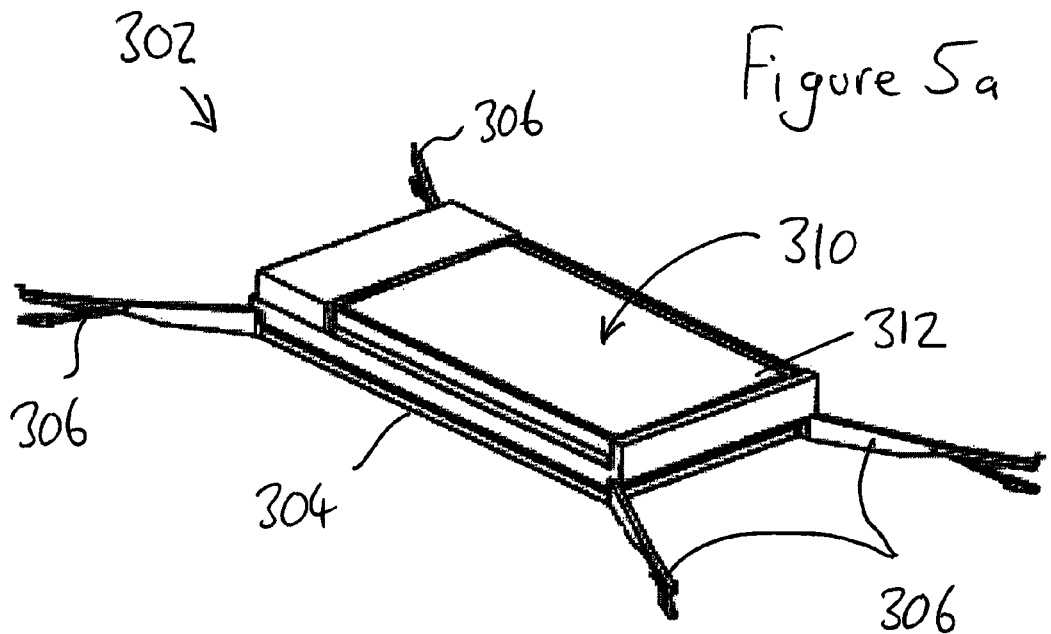
Figure 5B:
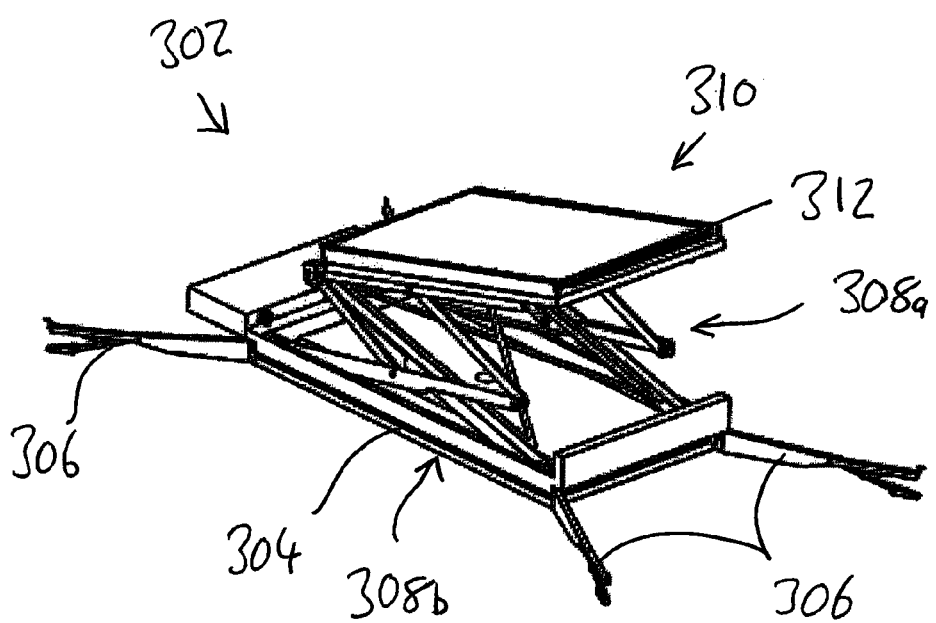
Figure 5C:
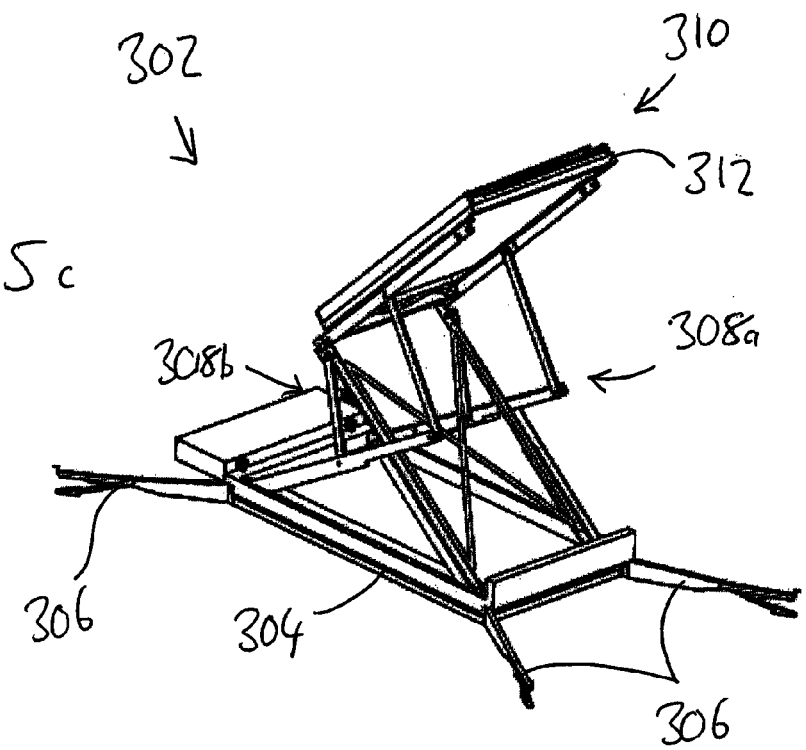
Figure 5D:
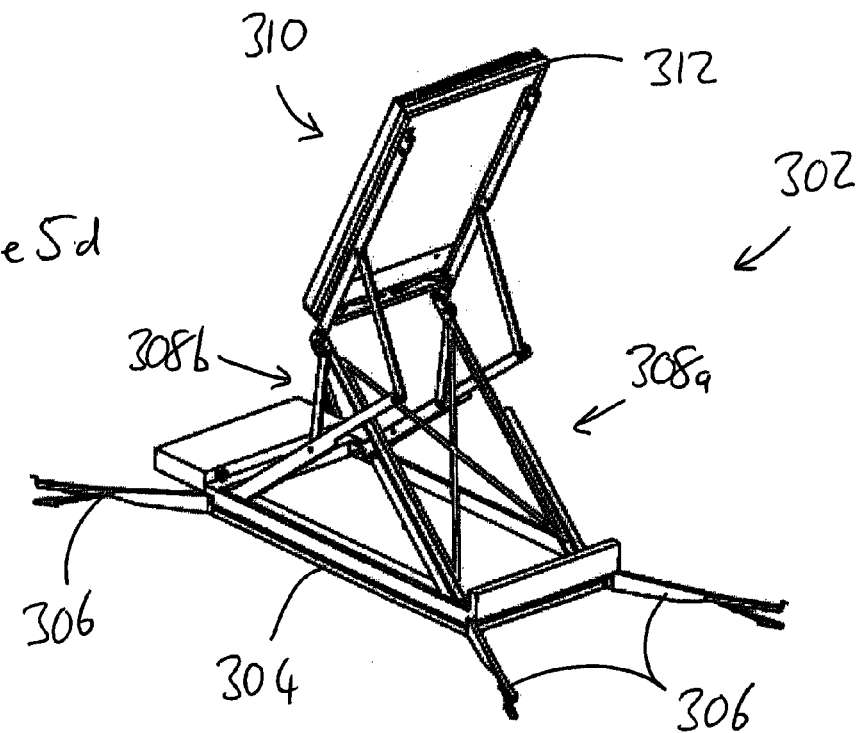
Figure 5E:
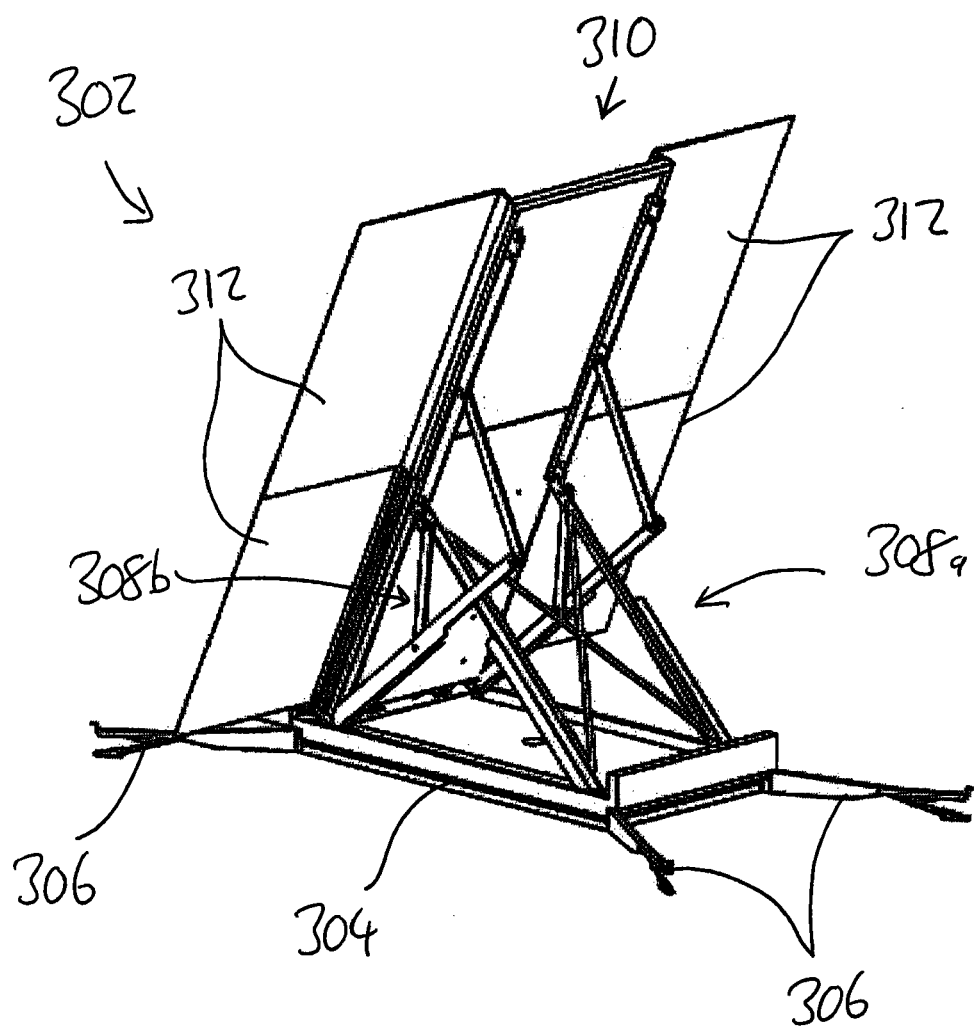

The assembly 302 further comprises a solar panel array 310 comprising a plurality of solar panels 312, hingedly attached to each other, so as to be movable between a folded position as shown in FIGS. 5a to 5d and an extended position shown in FIG. 5e.

The operation of the solar panel assembly 302 in moving from the retracted or stowed position to an extended position is shown in sequence in FIGS. 5a to 5e. In particular, in the stowed position, shown in FIG. 5a, the assemblies 308a, 308b and the solar panel array 310 lie within the volume contained by the base assembly 304. The solar panel array 310 is moved from the stowed position of FIG. 5a. As shown in FIGS. 5b to 5d, movement of the array 310 causes it to be displaced upwards and rotated relative to the base assembly 304, under the action of the assemblies 308a, 308b. The solar panel array 310 may be secured in any position between that of FIG. 5a and FIG. 5d, as required for effective operation. As described above, the assemblies 308a, 308b provide a range of movement that allows the solar panel array 310 to be moved to a position displaced from and extending perpendicular to the base assembly 304. However, in the case of a solar panel array, it is likely to be preferred that the array is position at an acute angle to the base assembly, as shown in FIG. 5e, for effective operation.

Once in the desired position for operation, for example as shown in FIG. 5d, the panels 312 of the array 310 are unfolded. In particular, the panels 312 are arranged to unfold under the action of gravity, that is with the array 310 in the position shown in FIG. 5d, gravity acts to lower and unfold the individual panels 312.

The assembly 302 is retracted to the stowed position as shown in the reverse sequence of FIGS. 5e to 5a.

In one embodiment, the assemblies 308a, 308b are mounted on the base assembly 304 so as to be rotatable about a vertical axis, allowing the solar panel array 310 to be rotated for accurate positioning relative to the prevailing position of the sun.

The general assembly shown it FIGS. 5a to 5e may be used in an analogous manner to deploy and support other components in like manner to the solar panel array. For example, the general assembly may be used to deploy and support signs, such as road signs, screens, such as for use with a projector, or other installations, particularly for temporary use.

The invention claimed is:

1. An assembly for converting motion, the assembly comprising:
   a first arm pivotably connected at a first position thereon to a first fixed pivot and rotable about said first fixed pivot;
   a second arm pivotably connected at a first position thereon to a second fixed pivot and rotable about said second fixed pivot, the second fixed pivot spaced apart from the first fixed pivot;
   a third arm pivotably connected at a first position thereon to the second arm at a second position on the second arm, the second position spaced apart from the first position on the second arm, the third arm having a point thereon;
   a first connecting arm extending between the first arm and the third arm, the first connecting arm pivotably connected to a second position on the first arm spaced apart from the first position on the first arm and pivotably connected to the third arm at a second position thereon spaced apart from the first position thereon; and
   a second connecting arm extending between the first arm and the second arm, the second connecting arm pivotably connected to a third position on the first arm disposed between the first and second positions thereon and pivotably connected to a third position on the second arm;
   wherein the position of the first fixed pivot is fixed relative to the position of the second fixed pivot; and
   wherein the assembly is moveable between a retracted position and an extended position, with movement of all of the said arms of the assembly between the retracted position and the extended position being confined to one side of a plane containing the first fixed pivot and the second fixed pivot.

2. The assembly according to claim 1, wherein the arms are arranged to be accommodated adjacent to one another or within one another when in the retracted position.

3. The assembly according to claim 1, wherein the first position on the first arm is at or adjacent an end of the first arm.

4. The assembly according to claim 1, wherein the first position on the second arm is at or adjacent an end of the second arm.

5. The assembly according to claim 1, wherein the second position on the second arm is at or adjacent an end of the second arm.

6. The assembly according to claim 1, wherein the first position on the third arm is at or adjacent an end of the third arm.

7. The assembly according to claim 1, wherein the ratio of the length of the first arm to the distance between the first and second fixed pivots is from 0.5 to 2.0.

8. The assembly according to claim 1, wherein the ratio of the length of the second arm to the distance between the first and second fixed pivots is from 0.5 to 2.0.

9. The assembly according to claim 1, wherein the length of the first and second arms is substantially the same.

10. The assembly according to claim 9, wherein the lengths of the first, second and third arms are substantially the same.

11. The assembly according to claim 1, wherein the second position on the first arm is at or adjacent an end of the first arm.

12. The assembly according to claim 1, wherein the ratio of the distance between the first position on the third arm and the second position on the third arm and the distance between the first position on the third arm and the said point on the third arm is from 0.1 to 0.9.

13. The assembly according to claim 1, wherein the ratio of the distance between the first position and the third position on the first arm and the distance between the first position and the second position on the first arm is from 0.1 to 0.9.

14. The assembly according to claim 1, wherein the third position on the second arm coincides with the second position on the second arm, such that the second connecting arm is connected to both the second and third arms.

15. The assembly according to claim 1, wherein the ratio of the distance between the first position and the third position on the second arm and the distance between the first position and the second position on the second arm is from 0.8 to 1.0.

16. The assembly according to claim 1, further comprising means to limit the movement of the third arm with respect to the first and second fixed pivots.

17. The assembly according to claim 16, wherein the said means comprises a plurality of hinged arm or hinged arm assemblies.

18. A system comprising a first component and a second component, the first component being arranged for movement with respect to the second component, wherein an assembly for converting motion according to claim 1 is provided between the first component and the second component, operation of the assembly providing movement of the first component with respect to the second component.

19. The system according to claim 18, wherein the first component is moveable with respect to the second component in a pattern that displaces and rotates the first component with respect to the second component.

20. The system according to claim 18 wherein the first component and/or the second component are building structures.

21. A building comprising:
   a first building portion and a second building portion, the first building portion being moveable relative to the second building portion between a retracted position and an extended position;
   wherein relative movement between the first and the second building portions and support of one of the first and second building portions with respect to the other of the first and second building portions are provided by an assembly according to claim 1.

\* \* \* \* \*